US010198000B2

(12) United States Patent
Mimura et al.

(10) Patent No.: US 10,198,000 B2
(45) Date of Patent: Feb. 5, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Kohei Okimoto, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/581,530

(22) Filed: Apr. 28, 2017

(65) Prior Publication Data
US 2017/0315551 A1     Nov. 2, 2017

(30) Foreign Application Priority Data

Apr. 28, 2016   (JP) ................................. 2016-091904

(51) Int. Cl.
*G05D 11/00*     (2006.01)
*G01C 21/36*     (2006.01)
(Continued)

(52) U.S. Cl.
CPC ........... *G05D 1/0061* (2013.01); *B60K 31/00* (2013.01); *B62D 15/025* (2013.01);
(Continued)

(58) Field of Classification Search
CPC .............. G05D 1/0061; G05D 1/021; G05D 2201/0213; G01C 21/3667; G01C 21/3697
See application file for complete search history.

(56) References Cited

U.S. PATENT DOCUMENTS 9,651,947 B2 *   5/2017   Kim ..................... G05D 1/0061
9,688,288 B1 *   6/2017   Lathrop ................ B60W 50/14
(Continued)

FOREIGN PATENT DOCUMENTS

JP     2005-71114 A       3/2005
JP     2005250564 A   *   9/2005   ............ B60W 50/12
(Continued)

OTHER PUBLICATIONS

Office Action dated Aug. 22, 2017, issued in counterpart Japanese Application No. 2016-091904. (13 pages).
(Continued)

*Primary Examiner* — Tuan C To
(74) *Attorney, Agent, or Firm* — Westerman, Hattori, Daniels & Adrian, LLP

(57) ABSTRACT

A vehicle control system includes: an automated drive control unit that performs automated driving where at least one of speed control and steering control of a vehicle is performed automatically, the automated drive control unit executing handover where an automated drive mode is switched to a manual driving mode; a calculating unit that calculates an occurrence frequency of the handover or an occurrence probability of the handover on a traveling route that the vehicle will travel; and a presentation unit that presents the occurrence frequency of the handover or the occurrence probability of the handover that has been calculated, to an occupant of the vehicle.

12 Claims, 14 Drawing Sheets

(51) Int. Cl.
    *G05D 1/02*     (2006.01)
    *G05D 1/00*     (2006.01)
    *B60K 31/00*     (2006.01)
    *B62D 15/02*     (2006.01)
    *G01C 21/34*     (2006.01)

(52) U.S. Cl.
    CPC ..... *B62D 15/0255* (2013.01); *G01C 21/3407* (2013.01); *G01C 21/3667* (2013.01); *G01C 21/3697* (2013.01); *G05D 1/021* (2013.01); *G05D 2201/0213* (2013.01)

(56) References Cited

U.S. PATENT DOCUMENTS

| | | | | |
|---|---|---|---|---|
| 9,784,585 | B2* | 10/2017 | Fausten | B60W 50/12 |
| 9,886,852 | B2* | 2/2018 | Urano | G05D 1/0088 |
| 9,902,399 | B2* | 2/2018 | Torii | B60W 30/16 |
| 2015/0166063 | A1* | 6/2015 | Ishihara | B62D 15/025 |
| | | | | 701/41 |
| 2015/0350969 | A1* | 12/2015 | Dudda | H04W 36/0005 |
| | | | | 370/331 |
| 2016/0249222 | A1* | 8/2016 | Li | H04W 16/14 |
| 2017/0030725 | A1* | 2/2017 | Gordon | B60W 30/00 |
| 2017/0113696 | A1* | 4/2017 | Oh | B60W 30/18163 |
| 2017/0208507 | A1* | 7/2017 | Wang | H04W 36/0005 |
| 2017/0236415 | A1* | 8/2017 | Okabe | G08G 1/096827 |
| | | | | 701/117 |
| 2018/0058879 | A1* | 3/2018 | Tayama | B60K 35/00 |
| 2018/0072326 | A1* | 3/2018 | Ichikawa | B60Q 1/343 |
| 2018/0074510 | A1* | 3/2018 | Isaji | B60W 40/09 |

FOREIGN PATENT DOCUMENTS

| | | |
|---|---|---|
| JP | 2009-241648 A | 10/2009 |
| JP | 2010-203975 A | 9/2010 |
| JP | 2013-54545 A | 3/2013 |
| JP | 2015-175824 A | 10/2015 |
| JP | 2016-18238 A | 2/2016 |

OTHER PUBLICATIONS

Office Action dated Nov. 21, 2017, issued in counterpart Japanese Application No. 2016-091904, with English machine translation. (13 pages).

* cited by examiner

FIG. 3
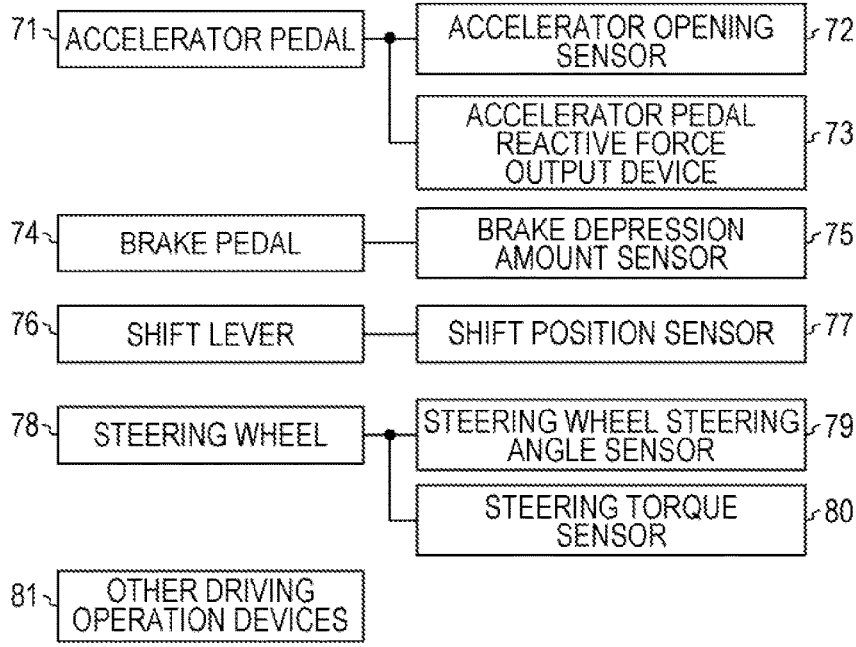
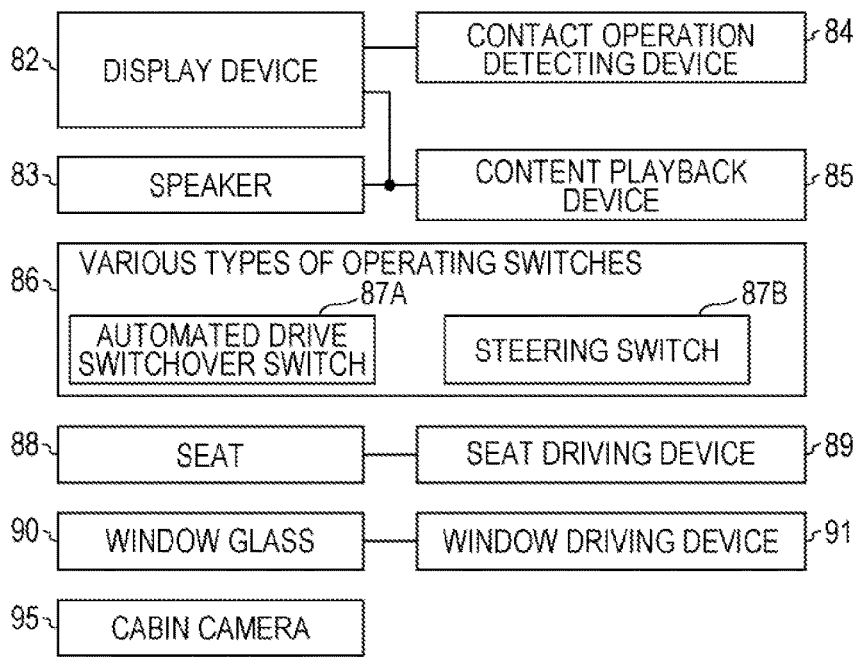

188

| DRIVING MODE<br>NON-DRIVING<br>OPERATION SYSTEM | MANUAL<br>DRIVING<br>MODE | AUTOMATED DRIVE MODE | | | ... |
| --- | --- | --- | --- | --- | --- |
| | | MODE A | MODE B | MODE C | |
| NAVIGATION OPERATIONS | NO | OK | OK | NO | ... |
| CONTENT PLAYING OPERATIONS | NO | OK | NO | NO | ... |
| INSTRUMENT PANEL OPERATIONS | NO | OK | OK | OK | ... |
| ... | ... | ... | ... | ... | ... |

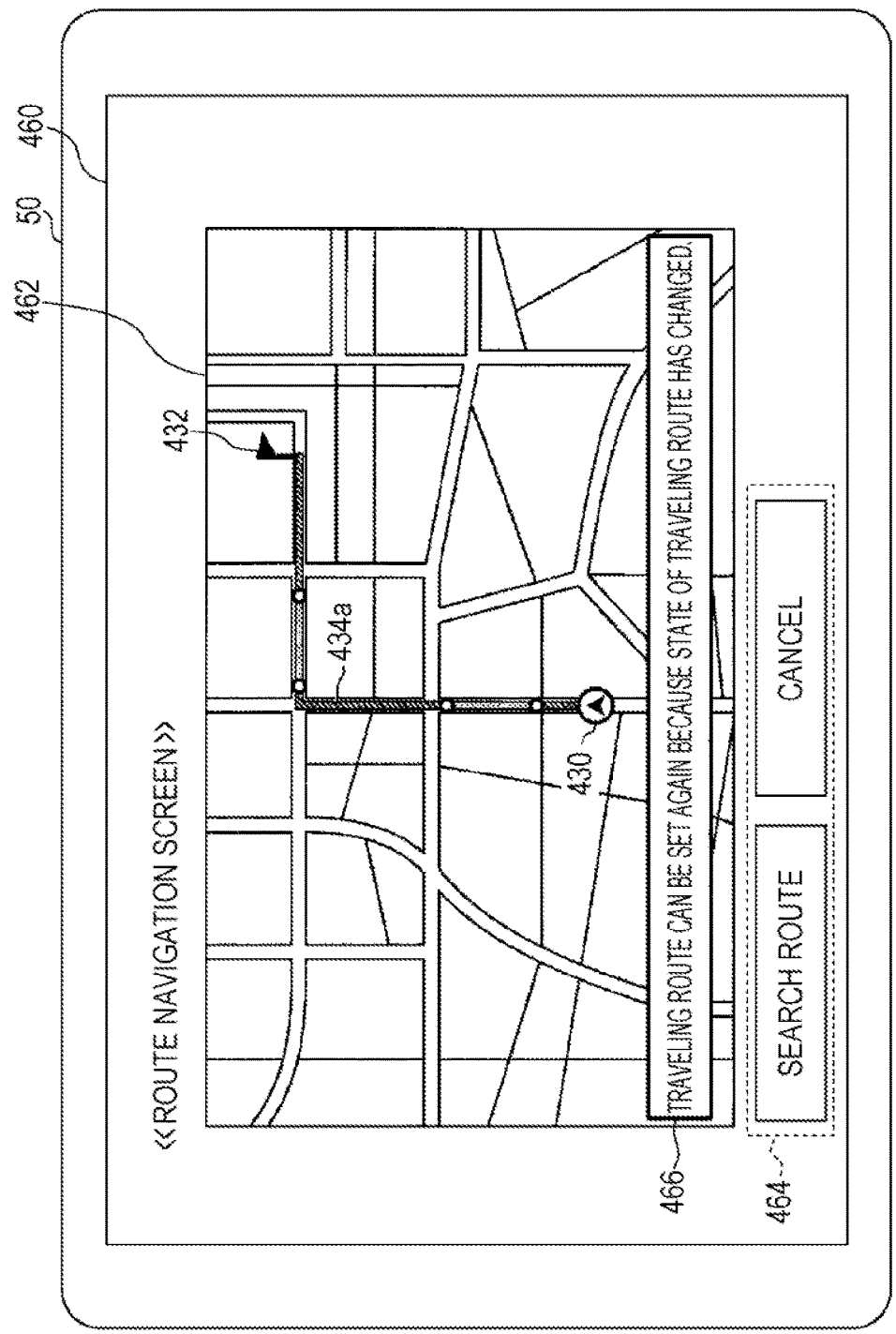

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-091904, filed Apr. 28, 2016, entitled "Vehicle Control System, Vehicle Control Method, And Vehicle Control Program." The contents of this application are incorporated herein by reference in their entirety.

BACKGROUND

1. Field

The present disclosure relates to a vehicle control system, a vehicle control method, and a vehicle control program.

2. Description of the Related Art

As of recent, research is being advanced regarding technology where at least one of acceleration/deceleration and steering of an automobile is automatically controlled, so that the automobile can travel following a route to a destination (hereinafter referred to as "automated drive"). With regard to such automated drive technology, there has been described a driving mode control device having a notification unit that notifies an occupant of handover, where transition is made from automated driving to manual driving (see Japanese Unexamined Patent Application Publication No. 2016-018238).

In a case where a planned traveling route includes both sections where automated driving is performed and sections where manual driving is performed, there will be points where handover occurs on the traveling route, handover being switching from automated driving to manual driving. An occupant in the vehicle responds to an occurrence of a handover by going from a state of not performing driving operations, to a state of starting driving operations. The vehicle passenger may want to know beforehand how often handover will occur along the traveling route. It has been found desirable to provide a vehicle control system, a vehicle control method, and a vehicle control program, where the vehicle passenger can confirm how often handover will occur along the traveling route.

SUMMARY

The present application describes an vehicle control system including: an automated drive control unit that performs automated driving where at least one of speed control and steering control of a vehicle is performed automatically, the automated drive control unit executing handover where an automated drive mode is switched to a manual driving mode; a calculating unit that calculates an occurrence frequency of the handover or an occurrence probability of the handover on a traveling route that the vehicle will travel; and a presentation unit that presents the occurrence frequency of the handover or the occurrence probability of the handover that has been calculated, to an occupant (a driver) of the vehicle. The word "unit" used in this application may mean a physical part or component of computer hardware or any device including a controller, a processor, a memory, etc., which is particularly configured to perform functions and steps disclosed in the application.

Accordingly, the occurrence frequency of the handover or the occurrence probability of the handover on the traveling route is presented to the vehicle passenger. Thus, the vehicle passenger can confirm the frequency at which handover will occur on the traveling route.

The vehicle control system may further include a traveling route determining unit that determines one or more traveling routes corresponding to a destination that has been set. The calculating unit may calculate an occurrence frequency of the handover or an occurrence probability of the handover for each of the one or more traveling routes. The presentation unit may present the occurrence frequency of the handover or the occurrence probability of the handover for each of the one or more traveling routes.

Accordingly, the handover occurrence frequency or the handover occurrence probability is presented to the vehicle passenger for each of the one or more calculated traveling routes corresponding to the destination that has been set. Thus, the vehicle passenger can select a traveling route appropriate for him/herself by referencing the frequency of handover occurring.

The presentation unit may further include one or more display units that display images, the traveling route determining unit displaying a traveling route to the destination, and the occurrence frequency of the handover or the occurrence probability of the handover on the traveling route, on the display unit.

Accordingly, the occurrence frequency of the handover or the occurrence probability of the handover is displayed along with a corresponding traveling route, so the vehicle passenger can accurately comprehend information relating to occurrence of handover by viewing the display.

The calculating unit may calculate a handover occurrence count on the traveling route (i.e., the expected number of times that the hang over will or may occur during traveling on the route) as the handover occurrence frequency.

Accordingly, the vehicle passenger can confirm the handover occurrence frequency from the handover occurrence count.

The calculating unit may calculate a handover occurrence rate, based on a ratio between a handover occurrence count calculated for the traveling route and a reference handover occurrence count corresponding to the traveling route, as the handover occurrence frequency.

Accordingly, the vehicle passenger can confirm the handover occurrence frequency from the handover occurrence rate.

The vehicle control system may further include a storage unit that stores history relating to past occurrences of handover on the traveling route, the calculating unit calculating the handover occurrence frequency based on the history relating to past occurrences of handover on the traveling route.

Accordingly, the handover occurrence frequency is calculated based on history relating to past occurrences of handover on the traveling route, so the handover occurrence frequency can be calculated with high precision in accordance with actual handover occurrences in the past.

The calculating unit may calculate the occurrence frequency of the handover or the occurrence probability of the handover, based on at least one of locations of branching places, locations of merging places, the number of branching places, and the number of merging places, on the traveling route.

Accordingly, the occurrence frequency of handover or the occurrence probability of handover can be appropriately calculated based on branching places or merging places on the traveling route.

The calculating unit may calculate the occurrence frequency of the handover or the occurrence probability of the handover, based on weather along the traveling route.

Accordingly, the occurrence frequency of handover or the occurrence probability of handover can be appropriately calculated based on weather on the traveling route.

The calculating unit may calculate the occurrence frequency of the handover or the occurrence probability of the handover, based on reception environment of airwaves (such as conditions for establishing telecommunications receiving radio waves) received for vehicle positioning along the traveling route.

Accordingly, the occurrence frequency of handover or the occurrence probability of handover can be appropriately calculated based on the reception environment of airwaves received for vehicle positioning along the traveling route.

The calculating unit may calculate the occurrence frequency of the handover or the occurrence probability of the handover, based on the state of lane lines on the road surface along the traveling route.

Accordingly, the occurrence frequency of handover or the occurrence probability of handover can be appropriately calculated based on the state of lane lines on the road surface along the traveling route.

The calculating unit may calculate the occurrence frequency of the handover or the occurrence probability of the handover, based on the direction of travel of the vehicle along the traveling route and the direction in which the sun is situated.

Accordingly, the occurrence frequency of handover or the occurrence probability of handover can be appropriately calculated based on the direction of travel of the vehicle along the traveling route and the direction in which the sun is situated.

A vehicle control method executed by an onboard computer includes: performing automated driving where at least one of speed control and steering control of a vehicle is performed automatically, and executing handover where an automated drive mode is switched to a manual driving mode; calculating an occurrence frequency of the handover or an occurrence probability of the handover on a traveling route that the vehicle will travel; and presenting the occurrence frequency of the handover or the occurrence probability of the handover that has been calculated, to an occupant of the vehicle.

A vehicle control program causes an onboard computer to execute performing automated driving where at least one of speed control and steering control of a vehicle is performed automatically, and executing handover where an automated drive mode is switched to a manual driving mode, calculating an occurrence frequency of the handover or an occurrence probability of the handover on a traveling route that the vehicle will travel, and presenting the occurrence frequency of the handover or the occurrence probability of the handover that has been calculated, to an occupant of the vehicle. It is understood and well known in the art that such program may be provided in a form of a computer program product having instructions stored in a computer readable media and readable and executable by a computer such as a vehicle control device to execute the instructions.

Accordingly, the occurrence frequency of the handover or the occurrence probability of the handover is presented to the vehicle passenger. Thus, the vehicle passenger can confirm the frequency at which handover will occur on the traveling route.

BRIEF DESCRIPTION OF THE DRAWINGS

FIG. 3 is a configuration diagram of a human-machine interface.

FIG. 18 is a diagram illustrating an example of a screen when performing route navigation.

DESCRIPTION OF THE PREFERRED EMBODIMENTS

Figure 1:
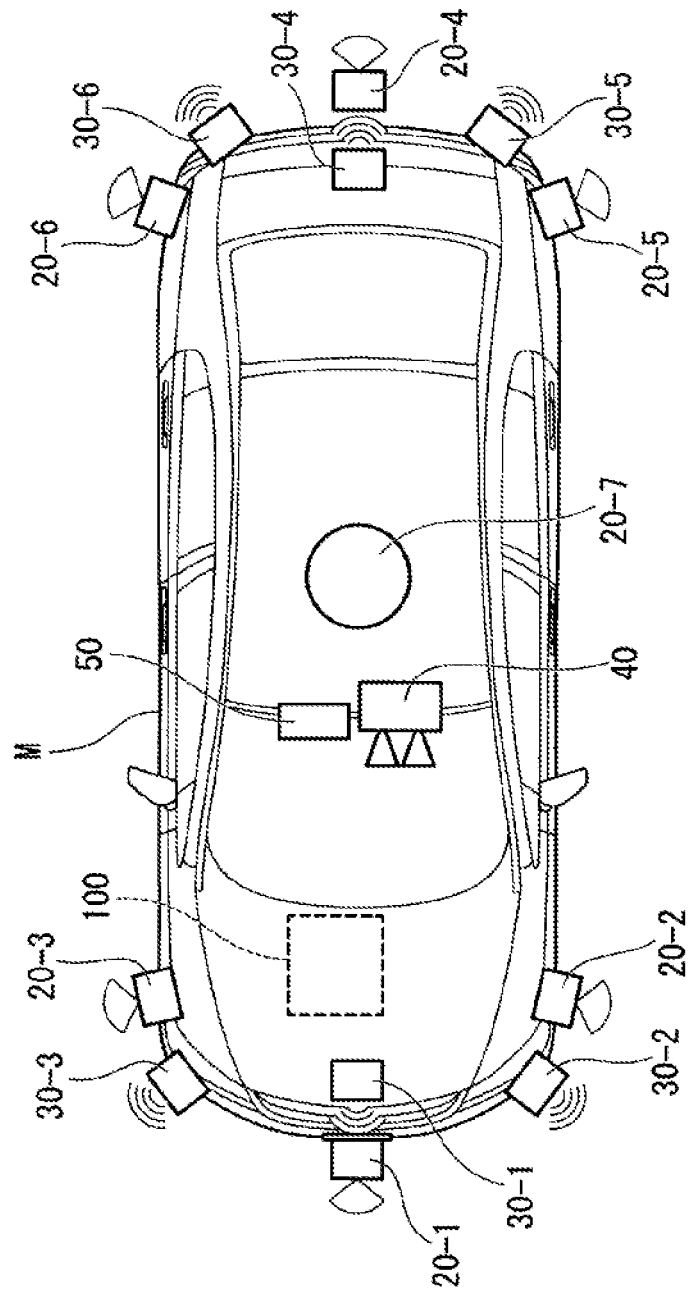
FIG. 1 is a diagram illustrating components of a vehicle in which a vehicle control system according to an embodiment is installed.

An embodiment of a vehicle control system, a vehicle control method, and a vehicle control program, according to the present disclosure, will be described with reference to the drawings. FIG. 1 is a diagram illustrating components of a vehicle in which a vehicle control system 100 according to the embodiment is installed (hereinafter referred to as "own vehicle M"). Examples of a vehicle in which the vehicle control system 100 is installed include automobiles using internal combustion engines such as diesel engines, gasoline engines, and so forth, as the power source, electric automobiles using electric motors as the power source, hybrid automobiles having both internal combustion engines and electric motors, and so forth, and the number of wheels may be two, three, four, or the like. Electric automobiles are driven using electric power discharged from batteries, examples of which include secondary batteries, hydrogen fuel cells, metal fuel cells, alcohol fuel cells, and so forth.

The own vehicle M is provided with sensors such as finders 20-1 through 20-7, radars 30-1 through 30-6, a camera (imaging unit) 40, and so forth, a navigation device (an example of a presentation unit or a display unit) 50, and the vehicle control system 100, as illustrated in FIG. 1.

The finders 20-1 through 20-7 are, for example sensors using LIDAR (short for either Light Detection and Ranging and Laser Imaging Detection and Ranging) that measures scattered light from emitted light, to measure distance to an object. As one example, the finder 20-1 is attached to the front grill or the like, and the finders 20-2 and 20-3 are attached to the sides or door mirrors of the vehicle, inside the headlights, near the turn indicators, or the like. The finder 20-4 is attached on the trunk lid or the like, and the finders 20-5 and 20-6 are attached at the sides of the vehicles, within the taillights, or the like. The finders 20-1 through 20-6 described above have a detection range of around 150 degrees with regard to the horizontal direction, for example. The finder 20-7 is attached to the roof or the like. The finder 20-7 has a detection range of 360 degrees with regard to the horizontal direction, for example.

The radars 30-1 and 30-4 are long-range millimeter wave radars that have a broader detection range than the other radars regarding the depth direction, for example. The other radars 30-2, 30-3, 30-5, and 30-6 are mid-range millimeter wave radars that have a narrower detection range than the other radars regarding the depth direction, for example.

Note that hereinafter, in a case where the finders 20-1 through 20-7 are not distinguished in particular, this will be written simply as "finder 20". In a case where the radars 30-1 through 30-6 are not distinguished in particular, this will be written simply as "radar 30". The radar 30 detects objects using frequency-modulated continuous wave (FMCW) technology, for example.

The camera 40 is a digital camera using a solid state imaging device such as a charge-coupled device (CCD) or complementary metal oxide semiconductor (CMOS) device or the like, for example. The camera 40 is attached to the upper part of the front windshield, on the rear side of the room mirror, or the like. The camera 40 periodically and repeatedly shoots in front of the own vehicle M, for example. The camera 40 may be a stereo camera including multiple cameras.

It should be noted that the configuration illustrated in FIG. 1 is only exemplary. Part of the configuration may be omitted, and further, other configurations may be added thereto.

Figure 2:
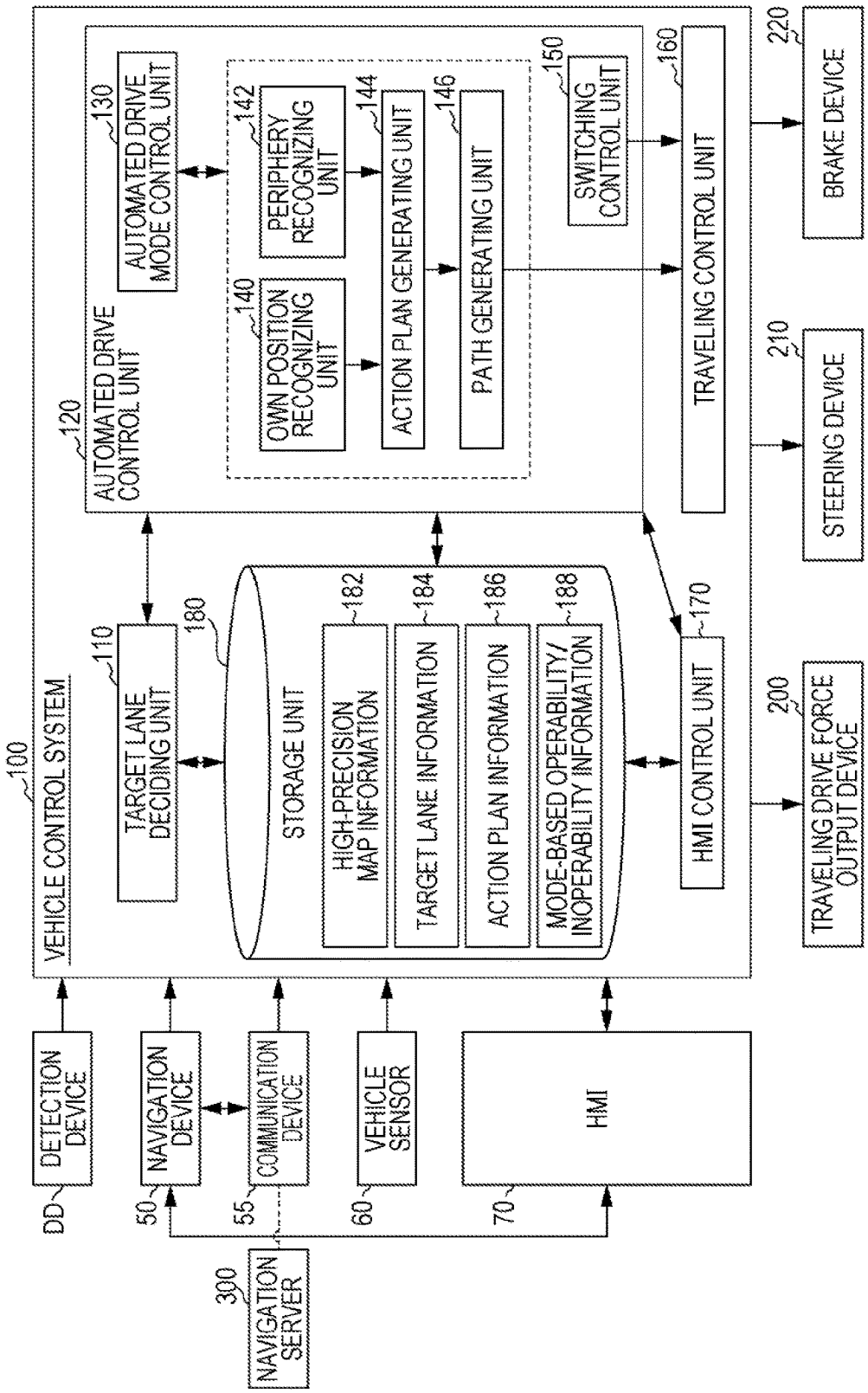
FIG. 2 is a functional configuration diagram centered on the vehicle control system.

FIG. 2 is a functional configuration diagram centered on the vehicle control system 100 according to the embodiment. The own vehicle M includes detection devices DD including the finder 20, radar 30, camera 40, and so forth, the navigation device 50, a communication device (acquisition unit) 55, a vehicle sensor 60, a human-machine interface (HMI) 70, the vehicle control system 100, a traveling drive force output device 200, a steering device 210, and a brake device 220. These devices and equipment are connected to each other by multiplexed communication lines or serial communication lines such as such as controller area network (CAN) communication lines, wireless communication networks, or the like. Note that the concept of "vehicle control system" as used in the Present Specification is not restricted to the vehicle control system 100 alone, and may include configurations other than the vehicle control system 100 (e.g., at least one of the detection devices DD, navigation device 50, communication device 55, vehicle sensor 60, HMI 70, and so forth).

The navigation device 50 has a global navigation satellite system (GNSS) receiver, a storage unit storing map information (navigation map) and so forth, a touch-panel display device functioning as a user interface, a speaker, a microphone, and so forth. The navigation device 50 identifies the position of the own vehicle M using the GNSS receiver, and acquires a route to the destination specified by a vehicle passenger (passenger) or the like of the own vehicle M from that position. The configuration for identifying the position of the own vehicle M may be provided independently from the navigation device 50. For example, the position of the own vehicle M may be identified or compensated by an inertial navigation system (INS) using output of the vehicle sensor 60, for example.

The navigation device 50 displays a screen (interface screen) for a vehicle passenger of the own vehicle M to set a destination, for example, and receives instructions from the vehicle passenger. The navigation device 50 transmits destination information accepted from the screen and information indicating the current position of the own vehicle M to a navigation server (external device) 300 via the communication device 55, and places a query for a traveling route.

The navigation server 300 (an example of a traveling route determining unit) acquires information relating to one or multiple traveling route candidates, based on the position information of the vehicle (the above-described own vehicle M) and destination information that have been saved, map information (navigation map) for route navigation that is stored beforehand and newest traffic information (congestion information) and so forth. The navigation server 300 also transmits the acquired information to the vehicle (the above-described own vehicle M) which has placed the query.

The navigation device 50 acquires information relating to traveling route candidates to the destination, that has been transmitted from the navigation server 300, via the communication device 55. Note that an arrangement may be made where the navigation device 50 does not acquire information relating to traveling route candidates to the destination from the navigation server 300, but rather acquires information relating to traveling route candidates using the navigation map stored in the navigation device 50.

The navigation device 50 outputs acquired information relating to traveling route candidates to a later-described target lane deciding unit 110 (an example of a calculating unit). The target lane deciding unit 110 references high-precision map information 182 regarding the candidate traveling routes input from the navigation device 50, and generates candidates of sections where automated driving can be performed in each traveling route.

The navigation device 50 displays information and the like relating to one or both of information relating to traveling route candidates and handover occurrence frequency (handover frequency) on the traveling route determined by the target lane deciding unit 110. Handover is switching from automated drive mode to manual driving mode. The navigation device 50 in this case may display, instead of or in addition to an interface screen displaying the traveling route, a screen displaying handover frequency, a selection screen for accepting selection operations regarding which traveling route to travel out of the candidate traveling routes, and so forth.

The navigation device 50 accepts the traveling route set by the vehicle passenger via the displayed screen, and outputs the accepted results to the vehicle control system 100. Thus, the vehicle control system 100 performs automated drive control and so forth of the own vehicle M over the set automated drive section, based on the settings information accepted by the navigation device 50. The vehicle control system 100 effects control relating to handover where the automated drive mode is switched to manual driving mode, in accordance with switching from the automated drive section to manual driving section.

Once the route to the destination has been decided, the navigation device 50 performs navigation to the destination by guidance through audio, screen display, and so forth, regarding the traveling route to the destination. While performing navigation of the own vehicle M over the traveling route that has been decided, the navigation device 50 rests the traveling route candidates from the current position of the own vehicle M to the destination and the handover frequency for the traveling route candidates using the target lane deciding unit 110 or the like, based on traveling route conditions obtained from the navigation server 300 (e.g., weather conditions and information of accidents). The navigation device 50 displays the traveling route candidates that have been set again, and the handover frequency, on the screen.

Note that the functions of the navigation device 50 described above can also be realized at a display unit (e.g., display device 82) or the like of the HMI 70. For example, the navigation device 50 may collaborate with the display unit of the HMI 70 or the like to display the content displayed by the navigation device 50 on the display device 82, or to display only on the display unit of the HMI 70. The navigation device 50 may acquire information input from the HMI 70 and perform processing accordingly.

The navigation device 50 may be realized by functions of a terminal device, such as a smartphone or tablet terminal or the like that a vehicle passenger of the own vehicle M or the like has, for example. In this case, information is exchanged between the terminal device and the vehicle control system 100 by wireless or cabled communication.

The communication device 55 performs wireless communication using, for example, cellular network, Wi-Fi network, Bluetooth (a registered trademark), dedicated short-range communication (DSRC), or the like. The communication device 55 exchanges data with the above-described navigation server 300, vehicles in the periphery of the own vehicle M, and so forth, for example, by wireless communication. For example, the communication device 55 may transmit route search query signals for the destination to the navigation server 300, and receive route search results as to the query, traveling route condition information, and so forth, from the navigation server 300.

The vehicle sensor 60 includes a vehicle speed sensor that detects vehicle speed, an acceleration sensor that detects acceleration, a yaw rate sensor that detects the angular speed on a vertical axis, a directional sensor that detects the orientation of the own vehicle M, and so forth.

FIG. 3 is a configuration diagram of the HMI 70. The HMI 70 includes a driving operation system configuration and a non-driving operation system configuration, for example. There is no clear-cut boundary between these two, and an arrangement may be made where the configuration of the driving operation system contains the functions of the non-driving operation system, or vice versa.

The HMI 70 includes, for example, an accelerator pedal 71, a throttle opening sensor 72, an accelerator pedal reactive force output device 73, a brake pedal 74, a brake depression amount sensor (alternatively, a master pressure sensor or the like) 75, a shift lever 76, a shift position sensor 77, a steering wheel 78, a steering wheel steering angle sensor 79, a steering torque sensor 80, and other driving operation devices 81, as the driving operation system configuration.

The accelerator pedal 71 is an operandum for accepting acceleration instructions (or deceleration instructions by a returning operation) by the vehicle passenger. The accelerator opening sensor 72 detects the amount of depression of the accelerator pedal 71, and outputs accelerator opening signals indicating the depression amount to the vehicle control system 100. Note that instead of outputting to the vehicle control system 100, output may be directly made to the traveling drive force output device 200, steering device 210, or brake device 220. This holds true regarding the other components of the driving operations system described below. The accelerator pedal reactive force output device 73 outputs force opposite to the direction in which the accelerator pedal 71 is operated (reactive force to operation) in accordance with instructions from the vehicle control system 100, for example.

The brake pedal 74 is an operandum to accept deceleration instructions from the vehicle passenger. The brake depression amount sensor 75 detects the depression amount (or depression force) of the brake pedal 74, and outputs brake signals indicating the detection results to the vehicle control system 100.

The shift lever 76 is an operandum for accepting gearshift change instructions by the vehicle passenger. The shift position sensor 77 detects the gearshift position instructed by the vehicle passenger, and outputs shift position signals indicating the detection results to the vehicle control system 100.

The steering wheel 78 is an operandum that accepts turning instructions from the vehicle passenger. The steering angle sensor 79 detects the operation angle of the steering wheel 78, and outputs steering angle signals indicating the detection results to the vehicle control system 100. The steering torque sensor 80 detects the torque applied to the steering wheel 78, and outputs steering torque signals indicating the detection results to the vehicle control system 100.

The other driving operation devices 81 are, for example, joysticks, buttons, dial switches, graphical user interface (GUI) switches, and so forth. The other driving operation devices 81 accept acceleration instructions, deceleration instructions, turning instructions, and so forth, and output to the vehicle control system 100.

The HMI 70 includes, for example, the display device 82, a speaker 83, a contact operation detecting device 84, a content playback device 85, various types of operating switches 86, a seat 88, a seat driving device 89, a window glass 90, a window driving device 91, and a cabin camera (imaging unit) 95, as the configuration of the non-driving operation system.

The display device 82 is a display device such as a liquid crystal display (LCD) or organic electroluminescence (EL) display or the like, installed at any portion of the instrument panel, or facing the passenger seat or rear seats. The display device 82 may also be a head-up display (HUD) where images are projected on a window, such as a front window seal or the like. Note that the display device 82, the navigation device 50, terminal devices which the vehicle passengers of the own vehicle M have (e.g., smartphones and tablet terminals), and so forth, are examples of a "display unit" that displays various types of information such as images and so forth.

The speaker 83 outputs sound. The contact operation detecting device 84 detects a contact position (touch position) on the display screen of the display device 82 in a case where the display device 82 is a touch panel, and outputs to the vehicle control system 100. If the display device 82 is not a touch panel, the contact operation detecting device 84 may be omitted.

The display device 82 can output information such as images and the like output from the above-described navigation device 50, and can output information from the vehicle passenger that the contact operation detecting device 84 has accepted, to the navigation device 50. Note that the display device 82 may have functions the same as the functions of the above-described navigation device 50, for example. The navigation device 50 may be included in the HMI 70.

Examples of the content playback device 85 include a digital versatile disc (DVD) players, compact disc (CD) players, television receivers, generating devices of various types of guidance navigation images, and so forth. Part or all of the display device 82, speaker 83, contact operation detecting device 84, and content playback device 85 may be common configurations with the navigation device 50.

The various types of operating switches 86 are disposed at optional positions within the cabin. The various types of operating switches 86 include an automated drive switchover switch 87A that instructs starting (or future starting) and stopping of automated driving, and a steering switch 87B that switches display contents at the display units (e.g., the navigation device 50, display device 82, and content playback device 85) and the like. The automated drive switchover switch 87A and steering switch 87B may be either of graphical user interface (GUI) switches and mechanical switches. The various types of operating switches 86 may also include switches for driving the seat driving device 89 and window driving device 91. Upon receiving operations from a vehicle passenger, the various types of operating switches 86 output operations signals to the vehicle control system 100.

The seat 88 is a seat where the vehicle passenger is seated. The seat driving device 89 drives the reclining angle, fore-aft position, yaw angle, etc., of the seat 88. The window glass 90 is provided to each door, for example. The window driving device 91 drives the window glass 90 open/closed.

The cabin camera 95 is a digital camera using a solid state imaging device such as a CCD or CMOS or the like. The cabin camera 95 is attached to a position capable of imaging at least the heads of the vehicle passenger performing driving operations, such as to the rearview mirror, steering boss, instrumental panel, or the like. The cabin camera 95 periodically and repeatedly shoots the vehicle passenger, for example. The cabin camera 95 may analyze imaged images based on facial feature information and the like, and acquire the position of the face of the vehicle passenger, the line of view, the state of posture, and so forth, for example.

The traveling drive force output device 200, steering device 210, and brake device 220 will be described before describing the vehicle control system 100.

The traveling drive force output device 200 outputs traveling drive force (torque) for the vehicle to travel, to the drive wheels. In a case where the own vehicle M is an automobile having an internal combustion engine as the power source for example, the traveling drive force output device 200 has an engine, a transmission, and an engine electronic control unit (ECU) for controlling the engine. In a case where the own vehicle M is an electric automobile having an electric motor as the power source, the traveling drive force output device 200 has a traveling electric motor and a motor ECU for controlling the traveling electric motor. In a case where the own vehicle M is a hybrid automobile, the traveling drive force output device 200 has an engine, transmission, engine ECU, traveling electric motor, and motor ECU. If the traveling drive force output device 200 includes only an engine, the engine ECU adjusts the throttle opening of the engine, gearshift, and so forth, following information input from a later-described traveling control unit 160. If the traveling drive force output device 200 includes only a traveling electric motor, the motor ECU adjusts the duty ratio of pulse-width modulation (PWM) signals provided to the traveling motor, following information input from the traveling control unit 160. If the traveling drive force output device 200 includes an engine and a traveling electric motor, engine ECU and motor ECU collaboratively control traveling drive force following information input from the traveling control unit 160.

The steering device 210 has a steering ECU and an electric motor, for example. The electric motor changes the steering direction by acting upon a rack-and-pinion mechanism, for example. The steering ECU drives the electric motor to change the steering direction, in accordance with information input from the vehicle control system 100, or information of the steering angle or steering torque that is input.

The brake device 220 is an electric servo brake device that has brake calipers, a cylinder that transmits hydraulic pressure to the brake calipers, an electric motor that generates hydraulic pressure at the cylinder, and a braking control unit, for example. The braking control unit of the electric servo brake device controls the electric motor in accordance with information input from the traveling control unit 160, so that brake torque corresponding to the control operations are output to the wheels. The electric servo brake device may have a backup mechanism where hydraulic pressure generated by brake pedal operations is transmitted to the cylinder via a master cylinder. Note that the brake device 220 is not restricted to being the above-described electric servo brake device, and may be an electronically controlled hydraulic brake device instead. An electronically controlled hydraulic brake device controls an actuator in accordance with information input from the traveling control unit 160, to transmit hydraulic pressure of a master cylinder to the cylinder. The brake device 220 may also include regenerative brakes using a traveling electric motor included in the traveling drive force output device 200.

Vehicle Control System

Description will be made regarding the vehicle control system 100. The vehicle control system 100 is realized by one or more processors, or hardware having functions equivalent thereto, for example. The vehicle control system 100 may be a configuration where a processor such as a central processing unit (CPU), a storage device, and a communication interface are connected to an ECU by an internal bus, or a micro-processing unit (MPU) or the like, are combined.

Returning to FIG. 2, the vehicle control system 100 has, for example, the target lane deciding unit 110, an automated drive control unit 120, the traveling control unit 160, and a storage unit 180. The automated drive control unit 120 has, for example, an automated drive mode control unit 130, an own position recognizing unit 140, a periphery recognizing unit 142, an action plan generating unit 144, a path generating unit 146, and a switching control unit 150.

Part or all of the target lane deciding unit 110, automated drive control unit 120, and traveling control unit 160 is realized by a processor executing a program (software). Part or all of these may be realized by hardware such as large scale integration (LSI) or application specific integrated circuit (ASIC) or the like, or may be realized by a combination of software and hardware.

The storage unit 180 stores, for example, high-precision map information 182, target lane information 184, action plan information 186, mode-based operability/inoperability information 188, and so forth. The storage unit 180 is realized by read-only memory (ROM), random access memory (RAM), a hard disk drive (HDD), flash memory, or the like. The program executed by the processor may be stored in the storage unit 180 beforehand, or may be downloaded from an external device via onboard Internet facilities, or the like. The program may be installed in the storage unit 180 by a transportable storage medium sorting the program being mounted to a drive device that is omitted from illustration. The computer of the vehicle control system 100 (onboard computer) may be decentralized among multiple computer devices.

The target lane deciding unit 110 is realized by an MPU, for example. The target lane deciding unit 110 divides a route provided from the navigation device 50 into multiple blocks (e.g., divides into 100 m increments with regard to the direction of travel of the vehicle), and references the high-precision map information 182 to decide the target lane for each block.

The target lane deciding unit 110 also determines whether or not automated driving can be performed, for each of the above blocks, for example, along the route provided from the navigation device 50. That is to say, the target lane deciding unit 110 determines which of automated drive mode and manual driving mode to set for each block. The target lane deciding unit 110 then decides, for sections where the own vehicle M can be driven in automated drive mode (automated drive sections) under control of the automated drive control unit 120, how many lanes from the left, for example, to drive in. Sections where traveling in automated drive mode can be performed can be set based on locations of freeway entrances/exits (ramps, interchanges, etc.), toll booths, etc., the shape of the road (straight for a predetermined distance or longer), and so forth, for example. Sections where driving can be performed in automated drive mode are, for example, sections of freeway driving and the like, but this is not restrictive, and may be sections on ordinary roads where the traffic is light, there are not many intersections, and so forth, for example.

The target lane deciding unit 110 also acquires traveling distance and predicted traveling time or the like as a rough indication, regarding the route provided from the navigation device 50. The traveling distance can be acquired based on distance information of the roads included in the high-precision map information 182. The predicted traveling distance can also be acquired based on the legal speed limit for traveling each road, included in the high-precision map information 182. Such information may be acquired from the navigation server 300.

The target lane deciding unit 110 also calculates the handover frequency for the route traveled by the own vehicle M, for example. The handover frequency in the present embodiment is calculated as one or both of the number of times of handover occurring on the route travelled by the own vehicle M (handover occurrence count) and handover occurrence rate (handover rate).

The target lane deciding unit 110 can calculate the handover occurrence count as follows. The target lane deciding unit 110 determines automated drive sections and manual driving sections on candidate traveling routes. Determining the automated drive sections and manual driving sections identifies the number of points where automated drive sections switch to manual driving sections (handover points). The target lane deciding unit 110 can then calculate the number of handover points on the traveling routes as handover occurrence counts. Note that the target lane deciding unit 110 may decide handover points based on places to branch and to merge on the traveling route, weather at a region corresponding to the traveling route, the state (clarity) of lines painted on the road surface on the traveling route (lines such as road edge lines, lane lines, center lines, etc.), positioning airwave reception states along the traveling route, the relationship between the direction of travel of the vehicle and the direction of the sun along the traveling route, and so forth.

In a state where the positional relationship among vehicles is complex and changes markedly, such as at places to branch and to merge, would be safer under manual driving. Accordingly, the target lane deciding unit 110 can decide handover points in accordance with points where there are places to branch and to merge along the traveling route. The target lane deciding unit 110 can identify places to branch and to merge by referencing the high-precision map information 182.

There are also cases where route sections on the traveling route would be better travelled by manual driving, such as when the weather is not good, like rain or snow. Accordingly, in a case where the amount of precipitation of rain or snow or the like is a certain amount with regard to the weather, the target lane deciding unit 110 can decide route portions where traveling safety will deteriorate depending on the weather, such as portions with tight curves, no streetlamps, insufficiently improved roads (e.g., unpaved roads) and so forth, to be manual driving sections. In this case, if a section immediately before a manual driving section decided in this way is an automated drive section, the target lane deciding unit 110 decides the start point of the manual driving section that has been decided to be a handover point.

The target lane deciding unit 110 can acquire information regarding weather from the information regarding the traveling route transmitted from the navigation server 300. The target lane deciding unit 110 can also identify route portions or the like where traveling safety will deteriorate depending on weather by referencing the high-precision map information 182, for example. Alternatively, the navigation server 300 may transmit the information regarding the traveling route with information regarding road conditions on the traveling route included therein. The target lane deciding unit 110 can use the information regarding road conditions included in the received information regarding the traveling route to identify route portions along the traveling route where traveling safety will deteriorate depending on the weather.

Also, route portions along the traveling route where the road lines have been eroded to where they are light (or gone) to where the detection devices DD cannot detect them well, are preferably driven by manual driving, taking the reliability of lane keeping and so forth into consideration. Accordingly, the route portions where the state or lines on the road surface is such that it is difficult for the detection devices DD or the like to appropriately detect the road lines can be decided to be manual driving sections, and handover points can be decided in accordance with the decided manual driving sections. As for points where it is difficult for the detection devices DD or the like to appropriately detect the road lines (difficult-to-detect points), information may be collected through continuous research or the like for example, and stored in the high-precision map information 182 or stored in the navigation server 300. The target lane deciding unit 110 can reference the difficult-to-detect points in the high-precision map information 182 to identify route portions where it is difficult for the detection devices DD to appropriately detect the road lines. Alternatively, the navigation server 300 may include information indicating difficult-to-detect points along the traveling route in the information relating to the traveling route, and transmit. The target lane deciding unit 110 then may identify route portions where it is difficult for the detection devices DD or the like to appropriately detect the road lines by using the difficult-to detect point information included in the traveling route.

Also, route portions along the traveling route where there are tunnels or tall buildings nearby tend to have poorer reception of airwaves received from satellites or the like for positioning regarding the own position. This may make it more difficult to accurately recognize the own position, so manual driving is more preferable. Accordingly, the target lane deciding unit 110 can decide route portions along the traveling route where reception of airwaves for positioning is not good to be manual driving sections, and decide handover points in accordance with the decided manual driving sections. As for points where the reception state of positioning airwaves is poor (poor reception points), information may be collected through continuous research or the like for example, and stored in the high-precision map information 182 or stored in the navigation server 300. The target lane deciding unit 110 can reference the poor reception points in the high-precision map information 182 to identify route portions where the reception state of positioning airwaves is poor. Alternatively, the navigation server 300 may include information indicating poor reception points along the traveling route in the information relating to the traveling route, and transmit. The target lane deciding unit 110 then may identify route portions where the appropriate detection of road lines by the detection devices or the like is difficult, by using the poor reception point information included in the traveling route.

Also, in situations where the sin is situated in front of the vehicle in the direction of travel along the traveling route, such as at evening in particular, the optical periphery sensing devices such as the camera 40 or the like, for example, will be shooting into the sunlight, so the detection reliability of the optical periphery sensing devices may fall below a certain level. In such cases, manual driving is preferable. Accordingly, the target lane deciding unit 110 identifies route portions where the sun will be shining from a direction in front of the shooting direction of the optical periphery sensing devices (i.e., where the optical periphery sensing devices will be shooting into the sunlight), based on the clock time at each point on the traveling route predicted when that traveling route is to be traveled, and the direction in which the sun is situated for each clock time. Such identified sections are sections where there is a possibility that the detection reliability of the optical periphery sensing devices may fall below a certain level. Thus, the target lane deciding unit 110 can decide the identified sections to be manual driving sections, and decide handover points in accordance with the decided manual driving sections. The target lane deciding unit 110 can predict the clock time for each point in a case where the vehicle travels the traveling route. Alternately, the navigation server 300 may predict the clock times and transmit this included in information relating to the traveling route. Sun direction information, where the direction of the sun has been correlated with the date and time, can be used for the direction where the sun will be situated. The sun direction information may be stored in the high-precision map information 182 for example, or may be stored in the navigation server 300. In this case, the navigation server 300 can transmit all of the sun direction information, or part of the sun direction orientation corresponding to the clock time at which the vehicle is estimated to be traveling the traveling route, included in the information relating to the traveling route.

The target lane deciding unit 110 can calculate the number of handover points that has been decided, by deciding the handover points as described above, as the handover occurrence count. It can thus be seen that the handover occurrence count decided as described above is not always the same even for the same traveling route, and may change depending on the weather, the time of day, and so forth.

The target lane deciding unit 110 can decide the handover rate as follows. The target lane deciding unit 110 first acquires a reference handover occurrence count regarding candidate traveling routes. The reference handover occurrence count is included in the information regarding traveling route candidates transmitted from the navigation server 300, for example. Upon setting the traveling route candidates, the navigation server 300 can then set the reference handover occurrence count by summing the number of reference handover points set for each block making up the set candidate traveling routes. Alternatively, the reference handover occurrence count may simply be calculated in accordance with the distance of the set candidate traveling routes.

The target lane deciding unit 110 can calculate the handover rate from the ratio between the handover occurrence count calculated for the traveling routes and the reference handover occurrence count set corresponding to the same traveling routes Specifically, the handover rate Hrt can be calculated by the following Expression (1)

$$Hrt = Hcnt/Href \qquad \text{Expression (1)}$$

where Hcnt represents the handover occurrence count and Href represents the reference handover occurrence count. In this case, if the handover occurrence count is equal to the reference handover occurrence count, the handover rate is 100%. If the handover occurrence count is less than the reference handover occurrence count, the handover rate is less than 100%. If the handover occurrence count is greater than the reference handover occurrence count, the handover rate is greater than 100%.

Note that the handover points decided as described above are based on prediction, and there is a possibility that when a route is actually traveled, a section that had been decided to be a manual driving section in accordance with change in weather or the like may be corrected to be an automated drive section, so automated drive control can be continued. That is to say, handover does not necessarily occur at the decided handover points. How readily a handover occurs will also differ depending on the handover point. Specifically, handover will almost always occur at a handover point that has been decided primarily due to branching or merging. On the other hand, automated driving may be continued at a handover point that has been decided primarily based on weather, depending on how the weather changes. Accordingly, the target lane deciding unit 110 may calculate the probability that a handover will actually occur (handover occurrence probability) for each handover point decided along the traveling route. The target lane deciding unit 110 may then use Expression (1), for example, to calculate the handover rate, with the calculated handover occurrence probability taken into consideration in the Expression.

In a case where there are places to branch and to merge along the traveling route, the target lane deciding unit 110 decides a target lane, so that the own vehicle M is traveling in a lane which is sensible to be in to advance to the branch, for example. The target lane decided by the target lane deciding unit 110 is stored in the storage unit 180 as target lane information 184.

The high-precision map information 182 is map information that is more highly precise than the navigation map that the navigation device 50 or navigation server 300 has. The high-precision map information 182 includes information relating to the middle of lanes, information of boundaries of lanes, and so forth, for example. The high-precision map information 182 may also include road information, traffic restriction information, address information (addresses and postal codes), facility information, telephone number information, and so forth. Road information may include information indicating the type of road, such as freeway, toll road, federal highway, state highway, and so forth, and other information such as the number of lanes of the road, the width of each lane, the grade of the road, the location of the road (3D coordinates including latitude, longitude, and elevation), curvature of curves for each lane, location of merging and branching points for each lane, traffic signs along the road, and so forth. The traffic restriction information may include information such as a lane being closed due to construction work, traffic accident, congestion, etc.

When acquiring information indicating traveling route candidates by the above-described navigation device 50, the target lane deciding unit 110 references the high-precision map information 182 or the like and acquires information of sections to be travelled in automated drive mode from the automated drive control unit 120, and outputs the acquired information to the navigation device 50. In a case of having finalized the traveling route to the destination and the automated drive sections by the navigation device 50, the target lane deciding unit 110 generates target lane information 184 corresponding to the traveling route and automated drive sections, and stores in the storage unit 180.

The automated drive control unit 120 performs automated driving where at least one of speed control and steering control of the own vehicle M is automatically performed, for example. Speed control is control of acceleration including one or both of acceleration and deceleration, having an amount of change in speed exceeding a threshold value over a unit of time, for example. Speed control may also include steady traveling control where traveling is performed within a certain speed range. The automated drive control unit 120 may also perform display control to display the selected traveling route and sections to perform automated driving on a display unit such as that of the navigation device 50 or the like.

The automated drive mode control unit 130 decides the mode for automated driving that the automated drive control unit 120 will carry out. The following modes are included in the automated drive modes according to the present embodiment. Note that the following is only an example, and the number of automated drive modes may be optionally decided.

Mode A

Mode A is a mode where the degree of automated driving is the highest. In a case where mode A is implemented, all vehicle control, such as complex merging control and the like, is performed automatically, so the vehicle passenger does not have to monitor the periphery or the state of the own vehicle M.

Mode B

Mode B is a mode where the degree of automated driving is next higher after mode A. In a case where mode B is implemented, basically all vehicle control is automatically performed, but in some cases, driving operations of the own vehicle M are relegated to the vehicle passenger. Thus, the vehicle passenger must monitor the periphery and the state of the own vehicle M.

Mode C

Mode C is a mode where the degree of automated driving is next higher after mode B. In a case where mode C is implemented, the vehicle passenger must perform confirmation operations as to the HMI 70 in some cases. For example, in mode C, in a case where the vehicle passenger is notified of the timing of changing lanes, and the vehicle passenger performs operations to instruct the HMI 70 to change lanes, automatic lane changing is performed. Thus, the vehicle passenger must monitor the periphery and the state of the own vehicle M.

The automated drive mode control unit 130 decides the automated drive mode based on operations of the vehicle passenger as to the HMI 70, events decided by the action plan generating unit 144, driving form decided by the path generating unit 146, and so forth. The automated drive mode is notified to a HMI control unit 170. Limits may also be set to the automated drive modes, based on the capabilities of the detection devices DD of the own vehicle M and so forth. For example, in a case where the capabilities of the detection devices DD are low, an arrangement may be made where mode A is not implemented. Any of the modes can be switched to manual driving mode by operations performed at the driving operation system configuration of the HMI 70 (overriding).

The own position recognizing unit 140 recognizes the lane where the own vehicle M is traveling (traveling lane) and the relative position of the own vehicle M as to the traveling lane, based on the high-precision map information 182 stored in the storage unit 180, and information input from the finder 20, radar 30, camera 40, navigation device 50, and/or vehicle sensor 60. The own position recognizing unit 140 recognizes the traveling lane by comparing patterns in road lanes (i.e., a layout of solid lines and broken lines) recognized from the high-precision map information 182 with patterns in road lanes in the periphery of the own vehicle M, recognized from images imaged by the camera 40, for example. The position of the own vehicle M acquired from the navigation device 50 and processing results by an INS may be included in this recognition.

Figure 4:
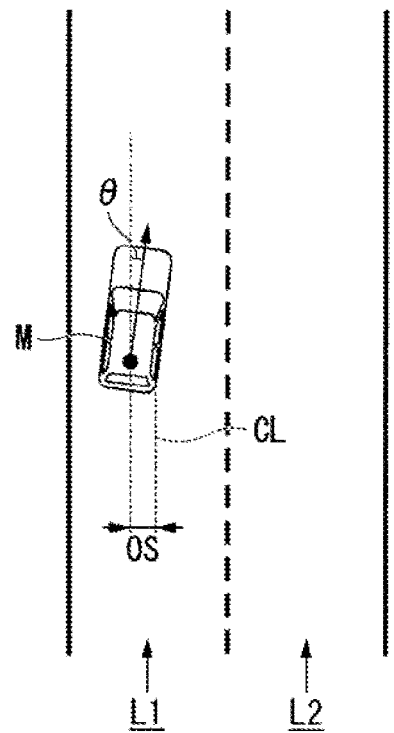
FIG. 4 is a diagram illustrating the way in which an own position recognizing unit recognizes the relative position of a traveling lane L1 as to an own vehicle.

FIG. 4 is a diagram illustrating illustrates the way in which the own position recognizing unit 140 recognizes the relative position of the own vehicle M as to the traveling lane L1. The own position recognizing unit 140 recognizes a deviation OS of a reference point of the own vehicle M (e.g., center of gravity) from the traveling lane center CL, and an angle θ as to a line formed by extending the traveling lane center CL in the direction of travel of the own vehicle M, as the relative position of the own vehicle M as to the traveling lane L1, for example. Alternatively, the own position recognizing unit 140 may recognize the position of the reference point of the own vehicle M as to either edge of the own traveling lane L1, or the like, as the relative position of the own vehicle M as to the traveling lane. The relative position of the own vehicle M recognized by the own position recognizing unit 140 is provided to the target lane deciding unit 110.

The periphery recognizing unit 142 recognizes the state of vehicles in the periphery, such as the position, speed, acceleration, or the like thereof, based on information input from the finder 20, radar 30, camera 40, and so forth. Vehicles in the periphery are vehicles traveling in the periphery of the own vehicle M, in the same direction as the own vehicle M, for example. The positions of the vehicles in the periphery may be expressed by representative points of these other vehicles, such as the center of gravity, corners, or the like, or may be represented as regions expressed in the form of outlines of the other vehicles. The "state" of the vehicles in the periphery may include acceleration of the vehicles in the periphery, and whether or not the vehicles in the periphery are changing lanes (or whether or not attempting to change lanes), that is comprehended based on information from the above-described various types of equipment. In addition to vehicles in the periphery, the periphery recognizing unit 142 may also recognize the position of guardrails, utility poles, parked vehicles, pedestrians, fallen objects, railroad crossings, traffic lights, signs erected at construction sites, and other objects.

The action plan generating unit 144 sets a start point for automated driving and/or a destination for automated driving. The start point for automated driving may be the current position of the own vehicle M, or may be a point where an operation is made instructing automated driving. The action plan generating unit 144 generates an action plan for the section between the start point and the destination of automated driving. However, this is not restrictive, and the action plan generating unit 144 may generate an action plan for any section.

An action plan is made up of multiple events which are executed in sequence, for example. Examples of events include a deceleration event where the own vehicle M is decelerated, an acceleration event where the own vehicle M is accelerated, a lane-keeping event where the own vehicle M is caused to travel without veering from the traveling lane, a lane-changing event where the traveling lane is changed, an overtaking event where the own vehicle M is caused to overtake a vehicle ahead, a branching event where, at a branch point, the own vehicle M is caused to change lanes to a desired lane or to travel without veering from the current traveling lane, a merging event where, at a merging lane that merges with the main road, the own vehicle M is caused to decelerate and change lanes, a handover event, and so forth.

For locations where the target lane decided by the target lane deciding unit 110 changes, the action plan generating unit 144 sets a lane-changing event, a branching event, or a merging event. Information indicating the action plan generated by the action plan generating unit 144 is stored in the storage unit 180 as action plan information 186.

Figure 5:
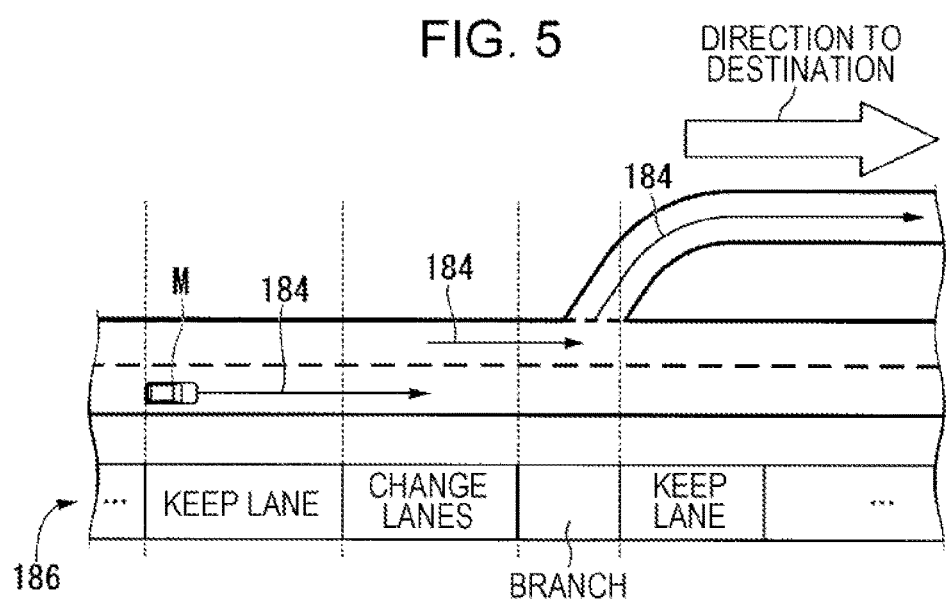
FIG. 5 is a diagram illustrating an example of an action plan generated regarding a certain section.

FIG. 5 is a diagram illustrating an example of an action plan generated regarding a certain section. The action plan generating unit 144 generates an action plan necessary for the own vehicle M to travel along the target lane indicated by the target lane information 184, as illustrated in FIG. 5. Note that the action plan generating unit 144 may dynamically change the action plan in accordance with change in the state of the own vehicle M, regardless of the target lane information 184. For example, in a case where the speed of a vehicle in the periphery that has been recognized by the periphery recognizing unit 142 while traveling along the lane exceeds a threshold value, or the direction of movement of a vehicle in the periphery traveling in a lane adjacent to the own lane is headed toward the own lane, the action plan generating unit 144 may change the event set for the driving section where the own vehicle M is planned to travel. In a case where an event has been set to execute a lane-changing event after a lane keeping even, for example, but the recognition results of the periphery recognizing unit 142 find that a vehicle is approaching at a speed exceeding a threshold value from behind in the lane to which lane changing was planned during this lane-keeping event, the action plan generating unit 144 may change the event following the lane-keeping event from the lane-changing event to a deceleration event, lane-keeping event, etc. Consequently, even in a case where change occurs in the state in the periphery, the vehicle control system 100 can perform safe automated driving of the own vehicle M.

Figure 6:
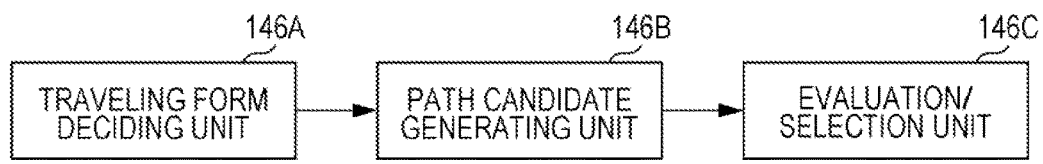
FIG. 6 is a diagram illustrating an example of the configuration of a path generating unit.

FIG. 6 is a diagram illustrating an example of the configuration of the path generating unit 146. The path generating unit 146 has a traveling form deciding unit 146A, a path candidate generating unit 146B, and an evaluation/selection unit 146C, for example. The traveling form deciding unit 146A, for example, decides which traveling form of constant-speed traveling, following traveling, low-speed following traveling, deceleration traveling, curve traveling, obstacle avoidance traveling, and so forth, to perform when carrying out a lane-keeping event. For example, if there are no other vehicles ahead of the own vehicle M, the traveling form deciding unit 146A decides the traveling form to be constant-speed traveling. If the own vehicle M is following another vehicle traveling ahead, the traveling form deciding unit 146A decides the traveling form to be following traveling. If the own vehicle M is caught in a traffic jam or the like, the traveling form deciding unit 146A decides the traveling form to be low-speed following traveling. If the periphery recognizing unit 142 has recognized that a vehicle traveling ahead has decelerated, or in a case where an event such as stopping or parking or the like is to be executed, the traveling form deciding unit 146A decides the traveling form to be deceleration traveling. In a case where the periphery recognizing unit 142 has recognized that the own vehicle M is approaching a curve, the traveling form deciding unit 146A decides the traveling form to be curve traveling. In a case where the periphery recognizing unit 142 has recognized that there is an obstacle ahead, the traveling form deciding unit 146A decides the traveling form to be obstacle avoidance traveling.

Figure 7:
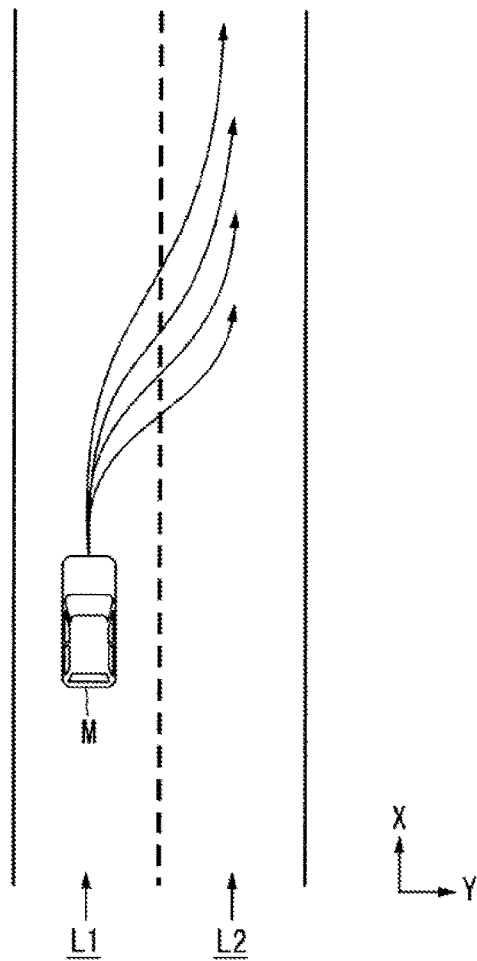
FIG. 7 is a diagram illustrating an example of candidate paths generated by a path candidate generating unit.

The path candidate generating unit 146B generates path candidates based on the traveling form decided by the traveling form deciding unit 146A. FIG. 7 is a diagram illustrating an example of candidates for paths generated by the path candidate generating unit 146B. FIG. 7 illustrates path candidates generated in a case of the own vehicle M changing lanes from lane L1 to lane L2.

Figure 8:
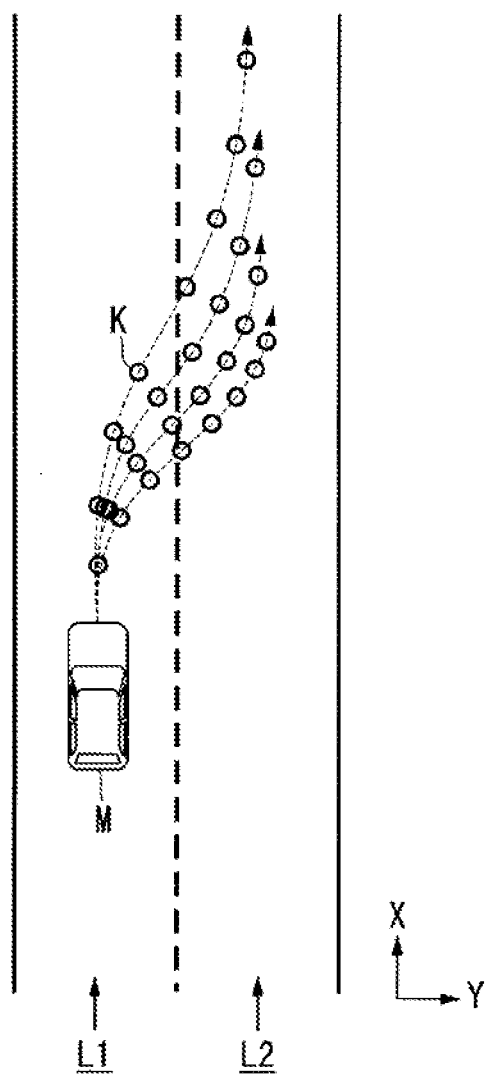
FIG. 8 is a diagram expressing candidates of paths generated by the path candidate generating unit as path points.

The path candidate generating unit 146B decides paths such as illustrated in FIG. 7 as collections of target positions (path points K) that a reference position of the own vehicle M (e.g., center of gravity or center of rear axle) should reach at each predetermined time in the future, for example. FIG. 8 is a diagram expressing path candidates generated by the path candidate generating unit 146B as path points K. The broader the interval between path points K is, the faster the speed of the own vehicle M is, and the narrower the interval between path points K is, the slower the speed of the own vehicle M is. Accordingly, when acceleration is desirable, the path candidate generating unit 146B sets the path points K so that the intervals gradually increase, and when deceleration is desirable, sets the path points K so that the intervals gradually decrease. Thus, the path points K include a speed component, so the path candidate generating unit 146B needs to provide each of the path points K with a target speed. The target speed is decided in accordance with the traveling form decided by the traveling form deciding unit 146A.

Now, a technique for deciding a target speed when changing lanes (including branching) will be described. The path candidate generating unit 146B first sets a lane-changing target position (or merging target position). The lane-changing target position is set as a relative position as to vehicles in the periphery, and is a decision regarding "between which vehicles in the periphery to change lanes to". The path candidate generating unit 146B focuses on three vehicles in the periphery using a lane-changing target position as a reference, and decides a target speed for changing lanes.

Figure 9:
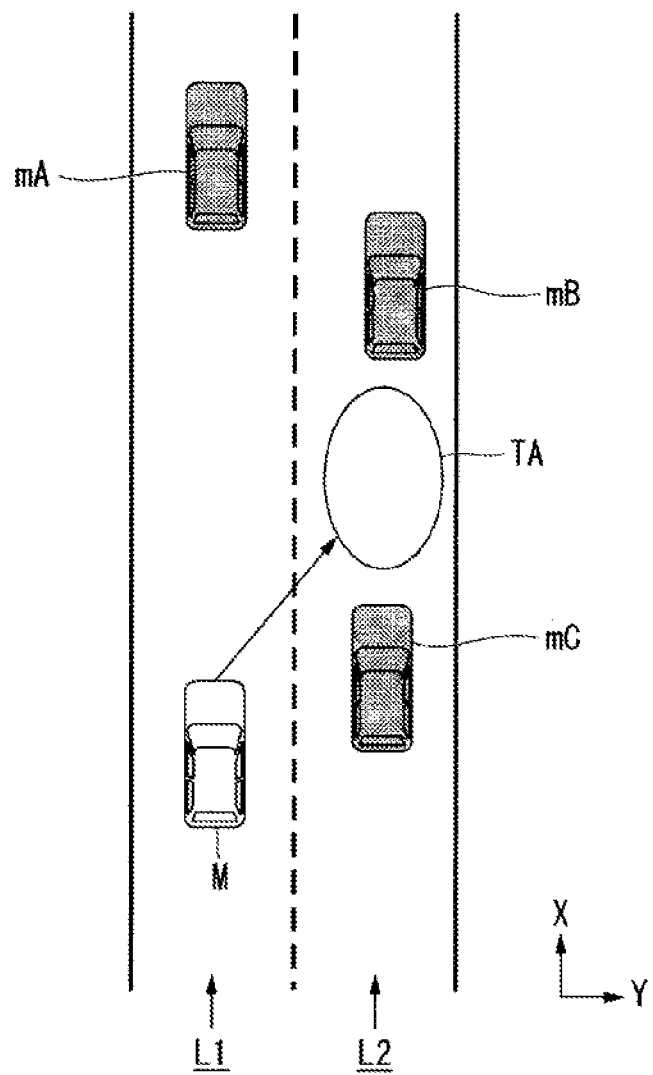
FIG. 9 is a diagram illustrating a lane-changing target position.

FIG. 9 is a diagram illustrating a lane-changing target position TA. In FIG. 9, L1 represents the own lane, and L2 represents an adjacent lane. Now, a vehicle in the periphery that is traveling immediately ahead of the own vehicle M in the same lane as the own vehicle M will be defined as a fore-traveling vehicle mA, a vehicle in the periphery that is traveling immediately ahead of the lane-changing target position TA as a fore-reference vehicle mB, and a vehicle in the periphery that is traveling immediately behind the lane-changing target position TA as an aft-reference vehicle mC. The own vehicle M must accelerate or decelerate to move to the side of the lane-changing target position TA, but must avoid catching up with the fore-traveling vehicle mA in doing so. Accordingly, the path candidate generating unit 146B predicts the future state of the three vehicles in the periphery, and decides the target speed so as to not interfere with any of these vehicles in the periphery.

Figures 10, 11:
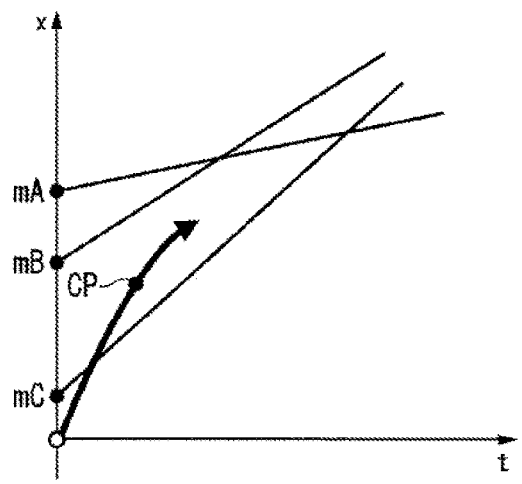
FIG. 10 is a diagram illustrating a speed generating model in a case where the speed of three vehicles in the periphery is assumed to be constant.
FIG. 11 is a diagram illustrating an example of mode-based operability/inoperability information.

FIG. 10 is a diagram illustrating a speed generation model, assuming that the speed of the three vehicles in the periphery is constant. The lines extending straight from points mA, mB, and m2 in FIG. 10 represent change in position of each of the vehicles in the periphery in the direction of travel, assuming that all vehicles in the periphery are traveling at a constant speed. At a point CP where lane changing is complete, the own vehicle M must be between the fore-reference vehicle mB and the aft-reference vehicle mC, and further must be behind the fore-traveling vehicle mA before that. Under such constraints, the path candidate generating unit 146B derives multiple time-sequence patterns of the target speed until changing of lanes is completed. The time-sequence patterns for the target speed are applied to a model such as a spline curve or the like, thereby deriving multiple path candidates such as illustrated in FIG. 7 described above. Note that the movement patterns of the three vehicles in the periphery is not restricted to prediction assuming constant speed illustrated in FIG. 10, and may be predicted assuming constant acceleration or constant jerk.

The evaluation/selection unit 146C performs evaluation of the path candidates generated by the path candidate generating unit 146B, from the perspective of two points, which planning and safety, for example, and selects a path to output to the traveling control unit 160. From the perspective of planning, for example, a path that is truer to the already-generated plan (e.g., the action plane), and has a short path length, will be highly evaluated. For example, in a case of changing lanes to the right, a path where the vehicle must first change lanes to the left and then come back will be evaluated low. From the perspective of safety, the greater the distance between the own vehicle M and other objects (vehicles in the periphery, etc.) is at each path point, and the smaller the amount of change in acceleration/deceleration and steering angle is, for example, the higher the evaluation will be.

The switching control unit 150 switches between automated drive mode and manual driving mode, based on signals input from the automated drive switchover switch 87A. The switching control unit 150 also switches from automated drive mode to manual driving mode, based on operations on the configuration of the driving operation system of the HMI 70 instructing acceleration, deceleration, or steering. For example, in a case where a state in which the operation amount of a signal input from the configuration of the driving operation system of the HMI 70 exceeds a threshold value for a reference amount of time or longer, the switching control unit 150 switches from automated drive mode to manual driving mode (overriding). The switching control unit 150 may also restore the automated drive mode if there is no detection of operations of the configuration of the driving operation system of the HMI 70 for a predetermined amount of time after having switched to the manual driving mode due to an override.

The traveling control unit 160 controls the traveling drive force output device 200, the steering device 210, and the brake device 220, so that the own vehicle M passes the traveling path (path information), generated (scheduled) by the path generating unit 146, on time. The traveling control unit 160 also controls acceleration/deceleration of the own vehicle M in accordance with the traveling path.

Upon being notified of information of the automated drive mode by the automated drive control unit 120, the HMI control unit 170 references the mode-based operability/inoperability information 188, and controls the HMI 70 according to the type of automated drive mode. FIG. 11 is a diagram illustrating an example of the mode-based operability/inoperability information 188. The mode-based operability/inoperability information 188 illustrated in FIG. 11 has "manual driving mode" and "automated drive mode" as driving mode items. The mode-based operability/inoperability information 188 also has the above-described "mode A", "mode B", and "mode C", and so forth, as "automated drive mode". The mode-based operability/inoperability information 188 further has "navigation operations" which are operations regarding the navigation device 50, "content playing operations" which are operations regarding the content playback device 85, "instrument panel operations" that are operations regarding the display device 82, and so forth, as non-driving operation system items. Although the example of the mode-based operability/inoperability information 188 illustrated in FIG. 11 is set regarding whether or not the vehicle passenger can operate the non-driving operation system according to each driving mode, the relevant interface device (display unit, etc.) is not restricted to this.

The HMI control unit 170 determines which devices are permitted to be used and which devices are not permitted to be used, by referencing the mode-based operability/inoperability information 188 based on mode information acquired from the automated drive control unit 120. Based on the determination results, the HMI control unit 170 controls whether or not operations by the vehicle passenger can be accepted regarding the non-driving operation system of the HMI 70 or the navigation device 50.

For example, in a case where the driving mode that the vehicle control system 100 is carrying out is the manual driving mode, the vehicle passenger operates the driving operation system (e.g., the accelerator pedal 71, brake pedal 74, shift lever 76, steering wheel 78, and so forth) of the HMI 70. Also, in a case where the driving mode that the vehicle control system 100 is carrying out is mode B, mode C, etc., in the automated drive mode, the vehicle passenger is responsible for monitoring the periphery of the own vehicle M. In this case, the HMI control unit 170 effects control so that part or all of the non-driving operation system of the HMI 70 does not accept operations, in order to prevent the vehicle passenger from being distracted (driver distraction) by actions other than driving (e.g., operating the HMI 70, etc.). In doing so, the HMI control unit 170 may display images or the like on the display device 82 the presence of vehicles in the periphery of the own vehicle M and the state of the vehicles in the periphery, recognized by the periphery recognizing unit 142, and accept confirmation operations at the HMI 70, in accordance with the current situation while the own vehicle M is traveling, in order to keep the vehicle passenger monitoring the periphery.

In a case where the driving mode is mode A in automated driving, the HMI control unit 170 relaxes restrictions on driver distraction, and effects control to accept operations by the vehicle passenger to the non-driving operation system, which had not been accepted before. For example, the HMI control unit 170 displays video on the display device 82, outputs sound from the speaker 83, plays content from DVDs or the like at the content playback device 85, and so forth. The content played by the content playback device 85 may include, besides contents stored on DVDs or the like, various types of contents relating to amusement or entertainment, such as TV programs and so forth. The "content playing operations" illustrated in FIG. 11 may mean to operate content relating to amusement or entertainment.

Screen Example

Screen examples of the navigation device 50 according to the present embodiment will now be described with reference to drawings. Note that the screen examples described below are not restrictive regarding the positions and sizes of display, the contents of display, and so forth.

Figure 12:
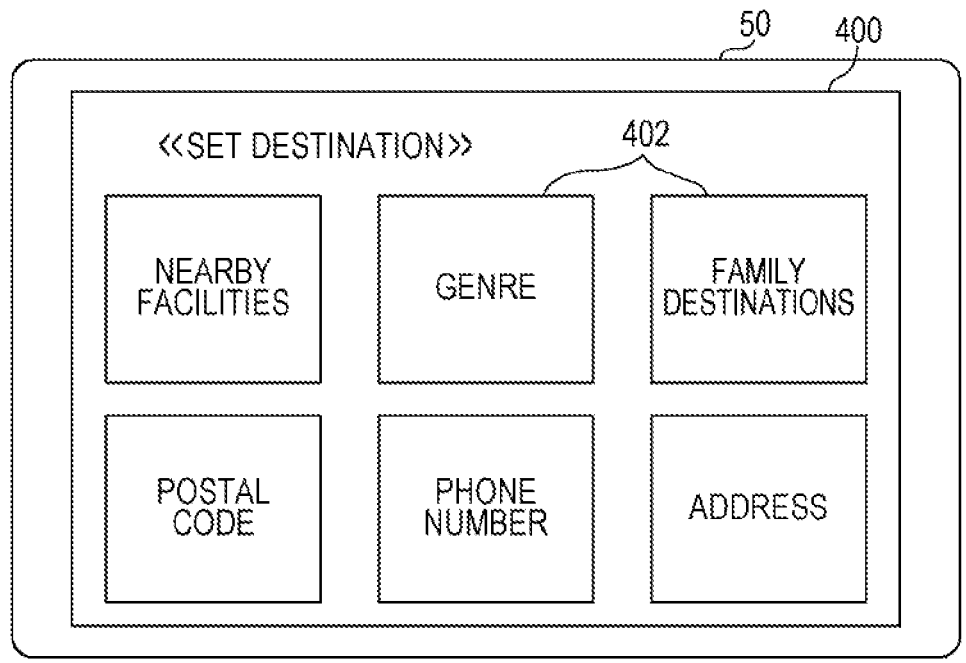
FIG. 12 is a diagram illustrating an example of a destination setting screen.

FIG. 12 is a diagram illustrating an example of an destination setting screen. Upon having accepted an instruction to set a destination from the vehicle passenger, the navigation device 50 displays a menu screen 400 for setting the destination, as illustrated in FIG. 12. The menu screen 400 has buttons (GUI icons, etc.) 402 to select a category from, such as "nearby facilities", "genre", "family destinations", "postal code", "phone number", "address", and so forth.

For example, in a case of accepting selection of the "nearby facilities" button, the navigation device 50 transitions to a screen to display nearby facilities (e.g., parking lots, gas stations, etc.) corresponding to the current location of the own vehicle M. In a case of accepting selection of the "genre" button, the navigation device 50 transitions to a screen to set a destination under conditions such as "restaurants", "parks", "movie theaters", and so forth. Also, in a case of accepting selection of the "family destinations" button, the navigation device 50 transitions to a screen to select a destination from a list such as "amusement parks", "zoos", "aquariums", and so forth. In a case of accepting selection of the "postal code" button, the navigation device 50 transitions to a screen where the destination can be set by inputting a postal code. In a case of accepting selection of the "phone number" button, the navigation device 50 transitions to a screen where the destination can be set by inputting a phone number. In a case of accepting selection of the "address" button, the navigation device 50 transitions to a screen where the destination can be set by inputting an address.

Figure 13:
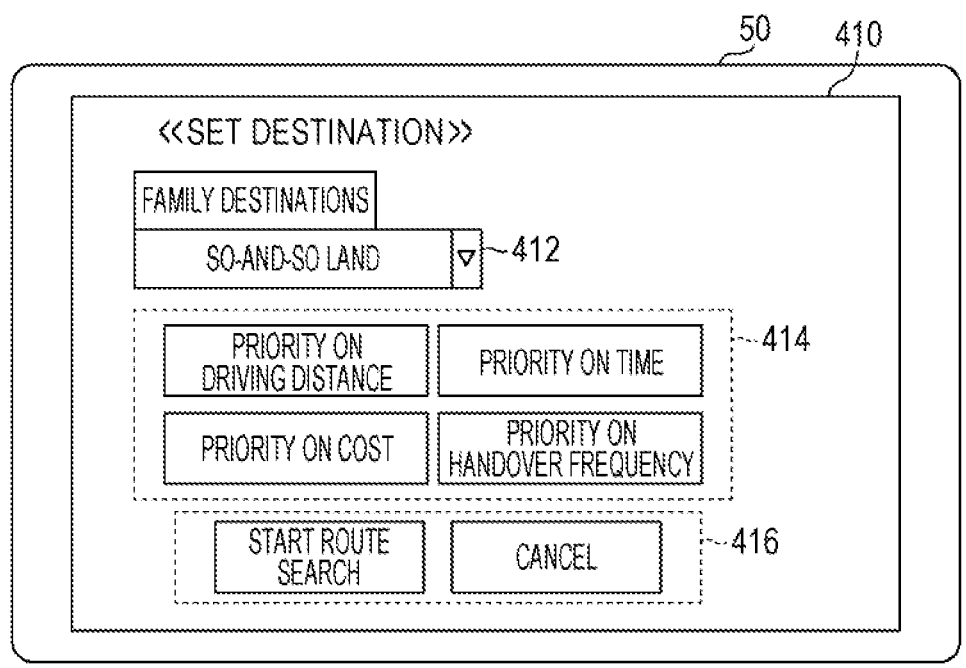
FIG. 13 is a diagram illustrating an example of a route search start screen.

FIG. 13 is a diagram illustrating an example of a route search start screen. The route search start screen 410 illustrated in the example in FIG. 13 includes an input region 412, a search conditions setting region 414, and a route search execution selection region 416. The "family destinations" button has been selected by the vehicle passenger in the menu screen 400 illustrated in FIG. 12, for example, in the example illustrated in FIG. 13, with "So-And-So Land" having been selected from a preset list of multiple family destinations, and displayed in the input region 412 of the route search start screen 410.

Buttons such as "priority on driving distance", "priority on time", "priority on cost", "priority on handover frequency", and so forth, are provided in the search conditions setting region 414, and at least one is selected to set the search conditions. For example, in a case where the "priority on driving distance" button has been selected, the route to the destination is searched in order of shortest driving distance. In a case where the "priority on time" has been selected, the route to the destination is searched in order of shortest predicted driving time. In a case where "priority on cost" has been selected, the route to the destination is searched in order of least cost in passage fess, such as toll roads encountered on the traveling route. In a case where the "priority on handover frequency" button has been selected, the route to the destination is searched in order of high handover frequency on the traveling route.

The route search execution selection region 416 has, for example, "start route search", "cancel", and so forth set. When selection of the "start route search" button is accepted, the navigation device 50 searches a route based on the set destination and search conditions. In a case where selection of the "cancel" button has been accepted, the navigation device 50 cancels the search for a route to the destination, and transitions to the menu screen 400 or the like.

Figure 14:
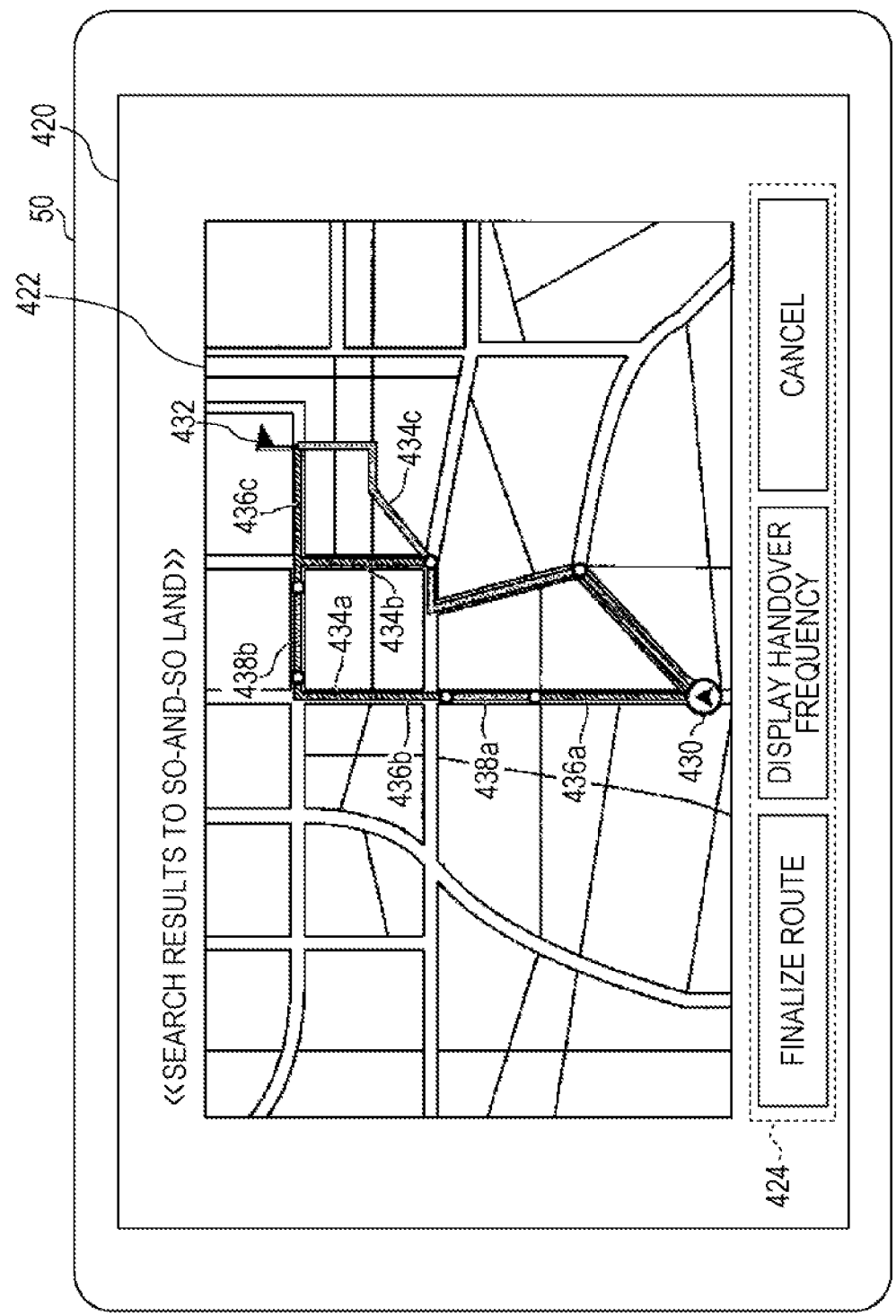
FIG. 14 is a diagram illustrating an example of a route search results display screen.

FIG. 14 is a diagram illustrating an example of a route search results display screen. The route search results display screen 420 illustrated in FIG. 14 has a route candidate display region 422 and a route navigation execution selection region 424. The route candidate display region 422 has displayed therein map information, an object 430 indicating the position of the own vehicle M, an object 432 indicating the location of the destination that has been set, and objects 434 indicating traveling route candidates. Note that the display forms of the objects 430 through 434 are not restricted to those illustrated in the example in FIG. 14. As one example, FIG. 14 illustrates objects 434a through 434c indicating three traveling routes candidates (e.g., route A through route C) found from the route search.

The navigation device 50 may display the objects 430 through 434 in the route candidate display region 422 superimposed on map information as illustrated in FIG. 14, or may generate an image integrated with map information and display this in the route candidate display region 422. The navigation device 50 may also display the objects 434a through 434c of the traveling route candidates at the same time, or may display the objects 434a through 434c of the candidates being switched in a predetermined order every predetermined amount of time.

The navigation device 50 either displays superimposed or integrated, on/with the image displayed on the route search results display screen 420, objects 436 indicating automated drive sections where the own vehicle M can travel in automated drive mode, for each of the objects 434a through 434c of the traveling route candidates. For example, the traveling route object 434a in FIG. 14 has three automated drive section objects 436a through 436c decided by the above-described target lane deciding unit 110, and two manual driving sections 438a and 438b, displayed using colors, designs, symbols, or the like, so as to be distinguishable from the traveling route object 434a and other images (objects, etc.).

The route search results display screen 420 illustrated in FIG. 14 may also be a selection screen for selecting a traveling route. In this case, the vehicle passenger of the own vehicle M touches the object of one traveling route out of the objects 434a through 434c of the traveling route candidates displayed on the route search results display screen 420 of the navigation device 50. Accordingly, selection operations of the traveling route are accepted, and that traveling route is selected.

The route navigation execution selection region 424 is provided with buttons such as "finalize route", "display handover frequency", "cancel", and so forth. In a case where selection of the "finalize route" button has been accepted, the navigation device 50 starts route navigation and automated driving of the traveling route and automated drive sections selected at the current point. In a case where selection of the "display handover frequency" button has been accepted, the navigation device 50 transitions to a handover frequency display screen. In a case where multiple traveling route candidates exist from the search results, the handover frequency is displayed for each traveling route candidate in the present embodiment. In a case where selection of the "cancel" button has been accepted, the navigation device 50 cancels the route search, and transitions to the menu screen 400.

Figure 15:
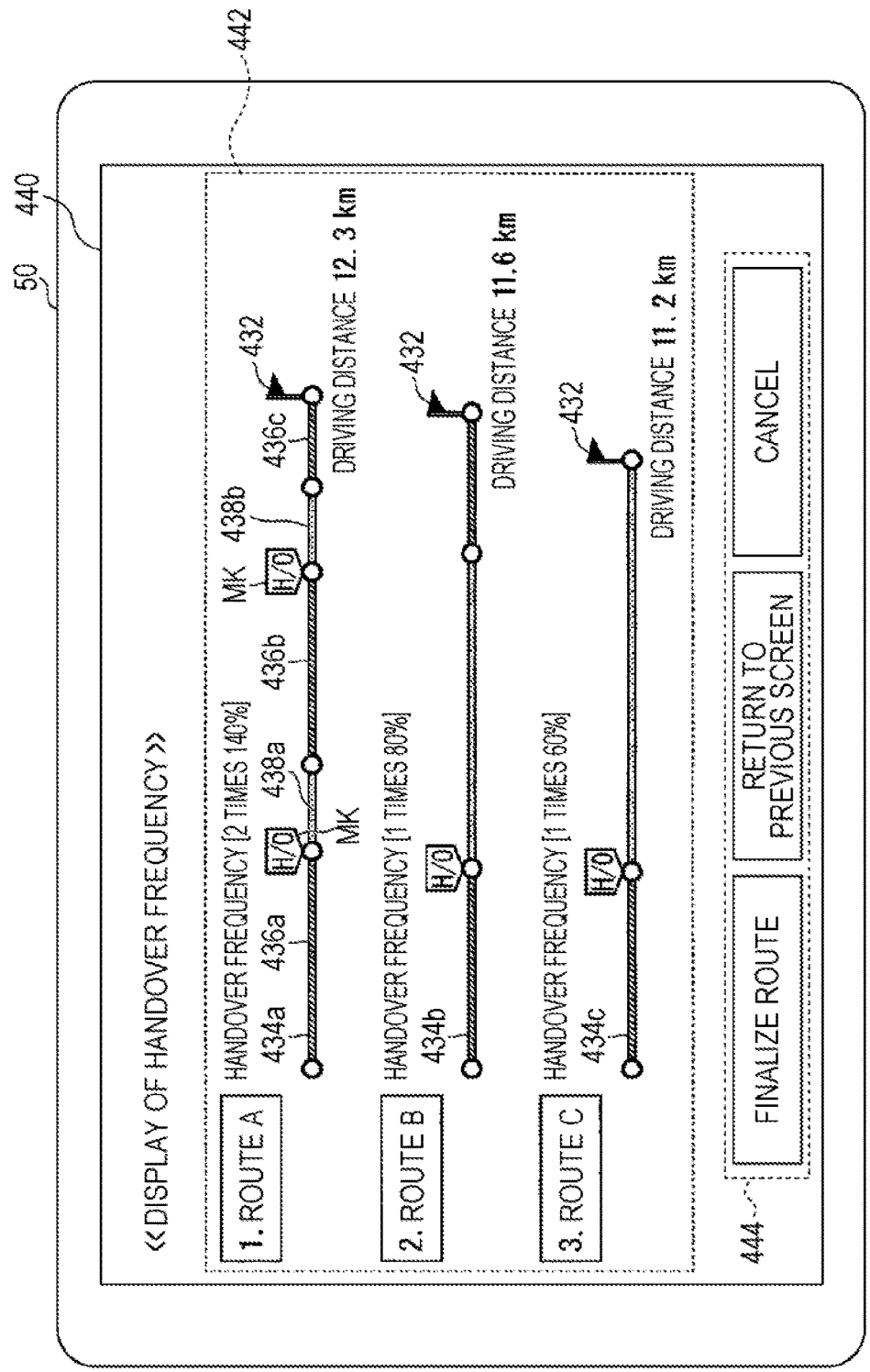
FIG. 15 is a diagram illustrating an example of a handover frequency display screen.

FIG. 15 is a diagram illustrating an example of the handover frequency display screen. The handover frequency display screen 440 illustrated in FIG. 15 has a handover frequency display region 442 and a route navigation execution selection region 444.

The handover frequency display region 442 displays handover frequency, driving distance, and the traveling route candidate objects 434a through 434c, for each of the three traveling route (e.g., route A through route C) obtained by the route search. The object 436 that indicates automated drive sections and the object 438 that indicates manual driving sections is also shown on the traveling route candidate objects 434a through 434c. Further, a handover indicator MK is placed at locations corresponding to points where an automated drive section is switched to a manual driving section (handover point), to indicate that this is a handover point on the traveling route candidate objects 434a through 434c. Note that the form of the handover indicator MK is not restricted to that illustrated in the example in FIG. 15.

As illustrated in FIG. 15, the handover frequency is displayed for each of the three traveling route candidates obtained by the route search. The handover occurrence count and the handover rate are displayed as the handover frequency for each of the corresponding traveling routes in FIG. 15. Specifically, the handover frequency for route A is listed as being "twice 140%", meaning that the handover occurrence count is twice and the handover rate is 140% for the handover frequency on route A. The driving time for when performing the above-described automated driving may be described on the handover frequency display region 442, or the driving time for manual driving may be displayed.

The navigation device 50 displays the traveling route candidate objects 434a through 434c from the current location of the own vehicle M to the destination (object 432) on the handover frequency display region 442 as straight lines. The traveling route candidate objects 434a through 434c are displayed having lengths corresponding to the driving distance. Accordingly, the driving schedule of the own vehicle M and the timings for the automated drive mode and so forth can be notified to the vehicle passenger in a way that is readily comprehensible.

The handover frequency display screen 440 illustrated in FIG. 15 may also be a selection screen for selecting a traveling route. In this case, the vehicle passenger of the own vehicle M touches a portion where there is displayed an object of one of the traveling routes, out of the traveling route candidate objects 434a through 434c displayed on the handover frequency display screen 440 of the navigation device 50. Accordingly, the selection operation for that traveling route is accepted, and that traveling route is selected. The navigation device 50 may alternatively accept selection of one of route A through route C, thereby selecting that traveling route.

The route navigation execution selection region 444 is provided with buttons such as "finalize route", "return to previous screen", "cancel", and so forth. In a case of having accepted selection of the "finalize route" button, the navigation device 50 starts route navigation and automated driving of the traveling route and automated drive section selected at the current point. In a case of having accepted selection of the "return to previous screen" button, the navigation device 50 transitions to the route search results display screen 420 illustrated in FIG. 14. In a case of having accepted selection of the "cancel" button, the navigation device 50 cancels the route search, and transitions to the menu screen 400.

Figure 16:
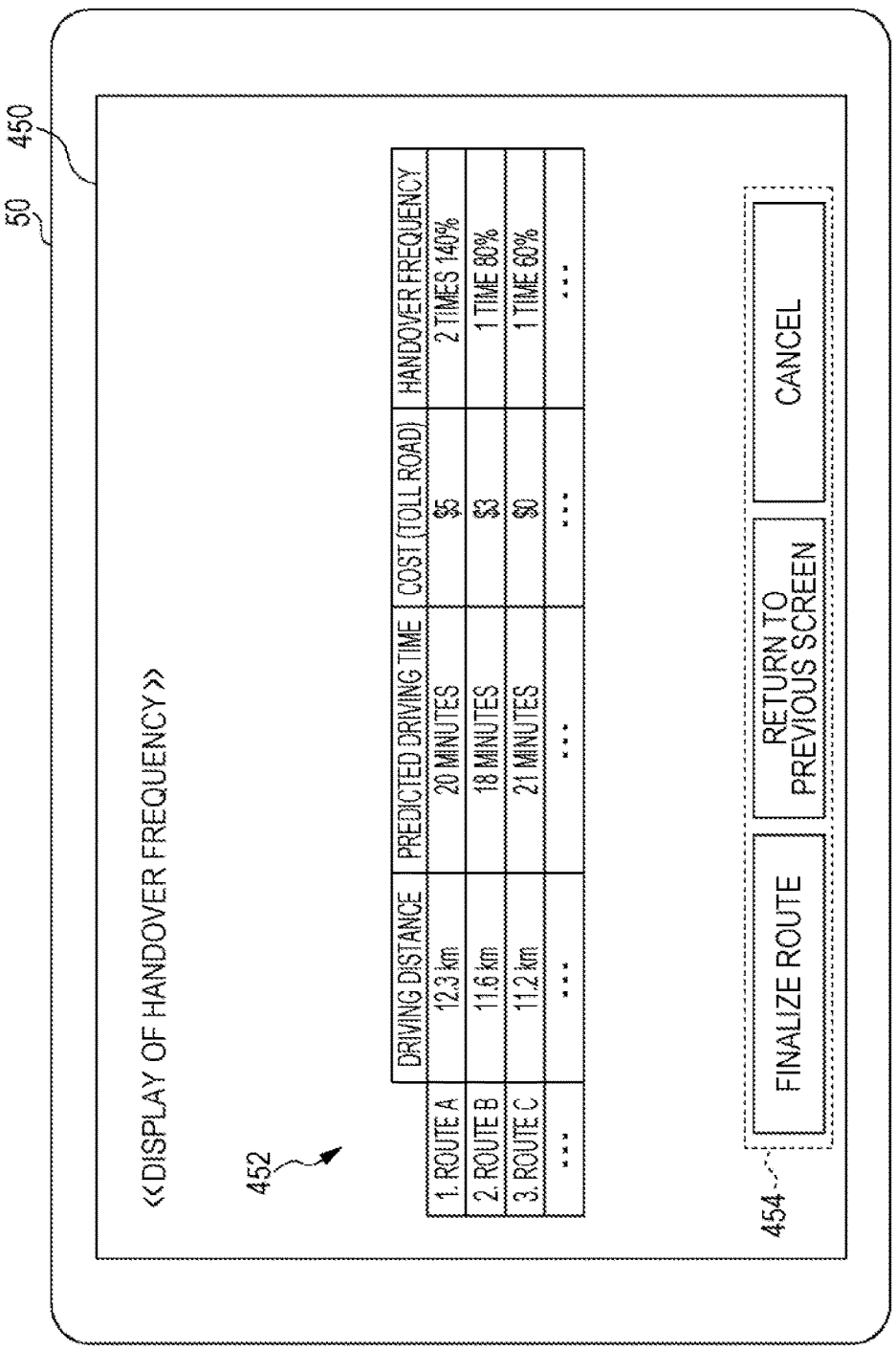
FIG. 16 is a diagram illustrating another example of a handover frequency display screen.

An example of the handover frequency display screen of the present embodiment is not restricted to the example illustrated in FIG. 15, and the handover frequency may be displayed in a list format, for example, or the like. FIG. 16 is a diagram illustrating another example of a handover frequency display screen. The handover frequency display screen 450 illustrated in FIG. 16 is provided with a handover frequency list 452 and a route navigation execution selection region 454. Note that the route navigation execution selection region 454 has the same buttons as the above-described route navigation execution selection region 444 and the processing contents by selection of the buttons is the same as the contents described above, so detailed description will be omitted here.

Displayed in the handover frequency list 452 are the driving distance to the destination, predicted driving time, cost (toll roads), and handover frequency, for example, for each of the three traveling routes obtained by route searching (e.g., route A through route C). Although the cost here is costs such as toll fees on the traveling route to the destination, for example, this is not restrictive, and this may be costs estimated from gas mileage of the own vehicle M. Further, the handover frequency list 452 may display the driving distance, predicted driving time, etc., in automated drive mode and manual driving for example, and may also display the number of times of switching between automated driving and manual driving (e.g., handover control count).

The handover frequency display screen 450 illustrated in FIG. 16 may also be a selection screen for selecting a traveling route. In this case, the vehicle passenger of the own vehicle M touches one region of regions where the text "route A" through "route C" in the handover frequency list 452, displayed on the handover frequency display screen 450, is displayed. Accordingly, selection operations of the traveling route corresponding to the displayed route are accepted, and that traveling route is selected.

An arrangement may also be made in FIGS. 15 and 16 where one or the other of handover occurrence count and handover rate is displayed as the handover frequency. Note that a screen may be displayed where part or all of the screens in the above-described examples in FIGS. 12 through 16 are combined. For example, the handover frequency display screens 440 and 450 in FIGS. 15 and 16 may be displayed in a single screen, and may be displayed on the route search results display screen 420 illustrated in FIG. 14. That is to say, the handover frequency corresponding to each candidate traveling route may be displayed in the route candidate display region 422 illustrated in FIG. 14.

Although description has been made in the examples in FIGS. 12 through 16 of screen examples displayed on the navigation device 50, the vehicle control system 100 may have, as one or more display units, one or both of the display devices installed in the own vehicle M (the navigation device 50, display device 82, etc.) and the terminal device that the vehicle passenger of the own vehicle M has, and part or all of the above-described screen examples may be displayed on multiple display units.

In this case, an arrangement may be made where, of the route search results display screen 420 illustrated in FIG. 14 for example, the route candidate display region 422 is displayed on the navigation device 50 and the route navigation execution selection region 424 is displayed on the terminal device. Each display unit is capable of exchanging data under control of the HMI control unit 170. Accordingly, information selected by the terminal device is reflected in the route candidate display region 422 displayed on the navigation device 50. The HMI control unit 170 can also display content displayed on the navigation device 50, on the display device 82 at the same time, for example. Which content to be displayed on which display unit may be preset, or may be optionally set by the vehicle passenger or the like.

Processing Flow

Figure 17:
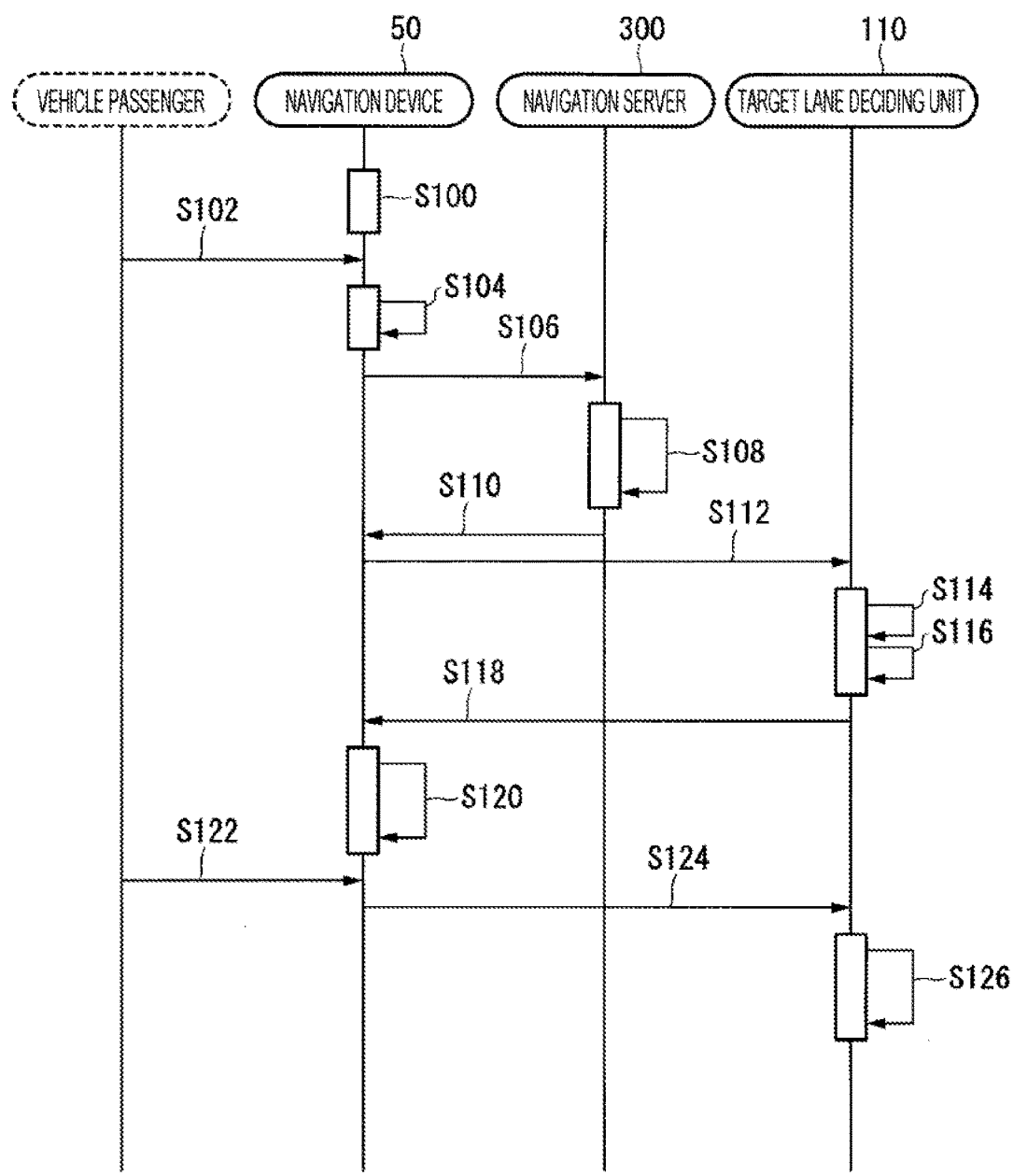
FIG. 17 is a sequence diagram illustrating an example of route setting processing.

The following is a description of route setting processing according to the present embodiment. FIG. 17 is a sequence diagram illustrating an example of route setting processing. The sequence diagram in FIG. 17 shows the navigation device 50, navigation server 300, and target lane deciding unit 110, for convenience of description.

In an example illustrated in FIG. 17, the navigation device 50 displays a menu screen or the like for setting the destination, to the vehicle passenger of the own vehicle M (step S100). Next, the navigation device 50 accepts setting information for the destination from the vehicle passenger (step S102), acquires the current location of the own vehicle M (step S104), and transmits the acquired current location and information relating to the destination (query signal) to the navigation server 300 via the communication device 55 (step S106).

The navigation server 300 generates information relating to at least one traveling route from the current location and destination information transmitted thereto, and transmits the information relating to the generated traveling route to the own vehicle M (step S108). Information relating to the traveling route is information such as, for example, which points to pass, driving distance to the destination, driving time, and so forth, but is not restricted to these. Information relating to the traveling route may also include, for example, map information, traffic information, weather information, and so forth.

The navigation server 300 may also store information indicating reception states of airwaves for positioning in correlation with the map, as described above, including points where the reception state of positioning airwaves is poor (poor reception points) in information relating to the traveling route. The navigation server 300 may further include points where it is difficult for the detection devices DD or the like to appropriately detect the road lines (difficult-to-detect points) in information relating to the traveling route. The navigation server 300 may moreover calculate a reference handover occurrence count for each generated route, as described above, and include the calculated reference handover occurrence count in information relating to the traveling route. The above-described traffic information, weather information, information indicating positioning airwaves reception state, information indicating state of lane lines on the road along the traveling route, and so forth, in the information relating to the traveling route, is used for calculation of handover frequency (i.e., decision of handover points) by the target lane deciding unit 110 in the present embodiment.

The navigation device 50 acquires information relating to the traveling route that has been transmitted from the navigation server 300 (step S110), and outputs the acquired information relating to the traveling route to the target lane deciding unit 110 (step S112).

The target lane deciding unit 110 decides automated drive sections and manual driving sections for each traveling route candidate, based on the information relating to the traveling route and the high-precision map information 182 (step S114). That is to say, deciding the automated drive sections and manual driving sections in step S114 is equivalent to deciding the handover points.

The target lane deciding unit 110 calculates the handover frequency based on the handover points decided in step S114 (step S116). That is to say, the target lane deciding unit 110 takes the number of handover points decided in step S114 as the handover occurrence count serving as the handover frequency. The target lane deciding unit 110 also calculates the handover rate as the handover frequency, from the ratio of the handover occurrence count corresponding to the number of handover points that have been decided, to the reference handover occurrence count included in the information relating to the traveling route.

The target lane deciding unit 110 outputs information relating to the automated drive sections and manual driving sections decided regarding each traveling route candidate, and information of the handover frequency calculated for each traveling route candidate, to the navigation device 50 (step S118). The navigation device 50 displays information relating to the traveling route, information regarding automated drive sections and manual driving sections, and information relating to handover frequency, on the screen (step S120). The information illustrated in FIGS. 14 and 15 described above, for example, is displayed on a screen in the processing in step S120.

Next, the navigation device 50 accepts information relating to the finalized traveling route by selection by the vehicle passenger of the own vehicle M (step S122), and outputs the accepted information to the target lane deciding unit 110 (step S124). The target lane deciding unit 110 performs decision of the target lane and so forth for automated driving and so forth, based on the finalized traveling route and automated drive sections, and performs vehicle control in collaboration with the automated drive control unit 120, traveling control unit 160, and HMI control unit 170 and so forth (step S126). The automated drive control unit 120 performs control relating to handover, in accordance with handover points.

Note that the above-described route setting processing illustrated in FIG. 17 is executed before the navigation device 50 starts route navigation, but even while performing navigation of the own vehicle M along the decided traveling route, the navigation device 50 may reset traveling route candidates from the current location to the destination and the handover frequency of the traveling route candidates based on change in the state of the traveling route that has been decided, and display the reset traveling route candidates and handover frequency on the screen. The above change in the state of the traveling route includes cases where sudden thunderstorms, snow, or the like has been detected from weather information, cases where traffic accidents or the like on the planned route have been detected from traffic information, and so forth. In such cases, determination can be made that the state of the traveling route has changed. The newest information (weather or traffic accident information) or the like for the above-described weather information or traffic information can be periodically obtained from the navigation server 300 or the like, for example.

FIG. 18 is a diagram illustrating an example of a screen when performing route navigation. A route navigation screen 460 illustrated in FIG. 18 includes a route navigation display region 462 and a route search-again selection region 464.

The route navigation display region 462 displays map information, the object 430 indicating the location of the own vehicle M, the object 432 indicating the location of the destination that has been set, and the object 434 indicating the traveling route being navigated. FIG. 18 shows object 434a indicating the traveling route for route A, out of the three traveling routes described above (e.g., route A through route C), as one example.

The navigation device 50 periodically acquires information of the current location of the own vehicle M as it travels, and displays the location of the own vehicle M in correlation with the location information of the map in the route navigation display region 462, based on the acquired location information. The navigation device 50 continues to acquire weather information and traffic information from the navigation server 300 even while navigating the route, and determines whether or not the state of the traveling route has changed from when the route was set, based on the acquired information. In a case where determination is made that the state of the traveling route has changed, the navigation device 50 displays message information 466 in the route navigation display region 462 to the effect that the traveling route can be set again. One example of the message information 466 is to display information such as "TRAVELING ROUTE CAN BE SET AGAIN BECAUSE STATE OF TRAVELING ROUTE HAS CHANGED", or the like, as shown in FIG. 18 for example, but this is not restrictive.

Although description has been made so far that the handover frequency is presented to the vehicle passenger by display, but this may be presented by audio or the like, for example. Also, although description has been made so far that the handover frequency is presented to the vehicle passenger as the handover occurrence count and handover rate, the vehicle control system according to the present embodiment may be configured to present the handover occurrence probability, calculated as described above, for example.

The target lane deciding unit 110 may also calculate the handover frequency based on history relating to occurrences of handover in the past on the traveling route. As for a specific example, history relating to handovers that actually occurred when the vehicle was traveling, for example, is stored in the storage unit 180 in one configuration. The history relating to past handover occurrences may be information indicating points at which handover has occurred, for each of the blocks into which the route is divided, for example. The handover occurrence count in a block can be obtained from the number of points where handover has occurred. The handover occurrence frequency for each block stored in the storage unit 180 may be the newest information of past history, or may be an average of occurrence frequency for each time traveling over a certain period in the past. The target lane deciding unit 110 can calculate the handover frequency using the history relating to occurrences of handover for each block corresponding to the traveling route. For example, the target lane deciding unit 110 can use the handover frequency the same as that calculated based on the history relating to occurrences of handover as the handover frequency for this time as well. Alternatively, the target lane deciding unit 110 can obtain a tentative value for the handover frequency based on places to branch and to merge on the traveling route, weather at a region corresponding to the traveling route, the state of lane lines on the road surface on the traveling route, positioning airwave reception environments along the traveling route, the relationship between the direction of travel of the vehicle and the direction of the sun along the traveling route, and so forth, and correct the tentative value so that deviation from the handover frequency based on history relating to occurrences of handover becomes smaller than a certain value, thereby calculating the handover frequency.

The navigation device 50 displays, along with the display of the message information 466, a "search route" button and "cancel" button in the route search-again selection region 464. In a case where selection of the "search route" button is accepted, route searching at the navigation server 300 and handover point deciding at the target lane deciding unit 110, acquisition of handover frequency acquisition, and so forth is performed, and traveling route candidates are displayed as illustrated in FIG. 14. Accordingly, in a case where the handover frequency is changed in accordance with change in the state of the traveling route, the traveling route of the own vehicle M can be set again by the vehicle passenger. In a case where selection of the "cancel" button is accepted in the route search-again selection region 464, the navigation device 50 hides the message information 466 from view, and also hides the buttons in the route search-again selection region 464 from view. Accordingly, in a case where automated driving is no longer viable due deteriorating road conditions, poor visibility, traffic congestion or the like, based on change in the state of the traveling route in an automated drive section set beforehand, an appropriate handover frequency can be recalculated and displayed, so the vehicle passenger can accurately select a desired route.

According to the embodiment described above, the handover frequency over the traveling route to the destination can be displayed on a display unit, and the vehicle passenger can select a desired traveling route based on the displayed handover frequency.

Although a form to carry out the present disclosure has been described by way of an embodiment, the present disclosure is not restricted by the embodiment whatsoever, and various modifications and substitutions may be made without departing from the spirit and scope of the present disclosure.

What is claimed is:

1. A vehicle control system comprising:
   an automated drive control unit configured to perform automated driving where at least one of speed control and steering control of a vehicle is performed automatically, the automated drive control unit executing handover which switches an automated drive mode to a manual driving mode during a travel of the vehicle on a traveling route to a preset destination;
a calculating unit configured to calculate an occurrence frequency of the handover or an occurrence probability of the handover on the traveling route that the vehicle will travel; and
a presentation unit configured to present the occurrence frequency of the handover or the occurrence probability of the handover that has been calculated, to an occupant of the vehicle,
wherein the calculating unit calculates a handover occurrence count on the traveling route, and a handover occurrence rate based on a ratio between the handover occurrence count and a predetermined reference handover occurrence count corresponding to the traveling route, the handover occurrence rate being presented as the handover occurrence frequency.

2. The vehicle control system according to claim 1, further comprising:
a traveling route determining unit configured to determine one or more traveling routes to the preset destination,
wherein the calculating unit calculates the occurrence frequency of the handover or the occurrence probability of the handover for each of the one or more traveling routes, and
wherein the presentation unit presents the occurrence frequency of the handover or the occurrence probability of the handover for each of the one or more traveling routes.

3. The vehicle control system according to claim 2,
wherein the presentation unit comprises one or more display units that display images, and
wherein the traveling route determining unit displays the traveling route to the destination and the occurrence frequency of the handover or the occurrence probability of the handover on the traveling route, on the display unit.

4. The vehicle control system according to claim 1,
wherein the calculating unit calculates a handover occurrence count on the traveling route, which is presented as the handover occurrence frequency.

5. The vehicle control system according to claim 1, further comprising:
a storage unit configured to store history data relating to past occurrences of the handover on the traveling route,
wherein the calculating unit calculates the handover occurrence frequency based on the history data relating to the past occurrences of the handover on the traveling route.

6. The vehicle control system according to claim 1,
wherein the calculating unit calculates the occurrence frequency of the handover or the occurrence probability of the handover, based on at least one of: locations of road-branching places; locations of road-merging places; the number of road-branching places; and the number of road-merging places, on the traveling route.

7. The vehicle control system according to claim 1,
wherein the calculating unit obtains weather information along the traveling route and calculates the occurrence frequency of the handover or the occurrence probability of the handover, based on the weather information along the traveling route.

8. The vehicle control system according to claim 1,
wherein the calculating unit obtains information of reception environment of radio waves received for vehicle positioning along the traveling route and calculates the occurrence frequency of the handover or the occurrence probability of the handover, based on the reception environment of the radio waves.

9. The vehicle control system according to claim 1,
wherein the calculating unit obtains information of a state of lane lines on a road surface along the traveling route and calculates the occurrence frequency of the handover or the occurrence probability of the handover, based on the state of lane lines on the road surface along the traveling route.

10. The vehicle control system according to claim 1,
wherein the calculating unit obtains information of a direction of the travel of the vehicle along the traveling route and a position of the sun in the sky, and calculates the occurrence frequency of the handover or the occurrence probability of the handover, based on the direction of the travel of the vehicle along the traveling route and the position of the sun.

11. A vehicle control method performed by an onboard computer, the method comprising:
performing automated driving where at least one of speed control and steering control of a vehicle is performed automatically, and executing handover which switches an automated drive mode to a manual driving mode during a travel of the vehicle on a traveling route to a preset destination;
calculating an occurrence frequency of the handover or an occurrence probability of the handover on the traveling route that the vehicle will travel; and
presenting the occurrence frequency of the handover or the occurrence probability of the handover that has been calculated, to an occupant of the vehicle,
wherein the step of calculating the occurrence frequency of the handover or the occurrence probability comprises calculating a handover occurrence count on the traveling route, and calculating a handover occurrence rate based on a ratio between the handover occurrence count and a predetermined reference handover occurrence count corresponding to the traveling route, the handover occurrence rate being presented as the handover occurrence frequency.

12. A vehicle control program executable by an onboard computer, comprising instructions to execute:
performing automated driving where at least one of speed control and steering control of a vehicle is performed automatically, and executing handover which switches an automated drive to a manual driving mode during a travel of the vehicle on a traveling route to a preset destination;
calculating an occurrence frequency of the handover or an occurrence probability of the handover on the traveling route that the vehicle will travel; and
presenting the occurrence frequency of the handover or the occurrence probability of the handover that has been calculated, to an occupant of the vehicle,
wherein the step of calculating the occurrence frequency of the handover or the occurrence probability comprises calculating a handover occurrence count on the traveling route, and calculating a handover occurrence rate based on a ratio between the handover occurrence count and a predetermined reference handover occurrence count corresponding to the traveling route, the handover occurrence rate being presented as the handover occurrence frequency.

* * * * *